United States Patent [19]

Yamada et al.

[11] Patent Number: 5,218,692

[45] Date of Patent: Jun. 8, 1993

[54] DIGITAL PULSE TIMING PARAMETER MEASURING DEVICE

[75] Inventors: Yasuo Yamada; Katsuhisa Kondo; Tsutomu Takei, all of Kanagawa; Masafumi Takahashi, Chiba, all of Japan

[73] Assignee: Kabushiki Kaisha Toshiba, Kawasaki, Japan

[21] Appl. No.: 546,450

[22] Filed: Jul. 3, 1990

[30] Foreign Application Priority Data

Jul. 4, 1989 [JP] Japan ................ 1-171238
Jul. 27, 1989 [JP] Japan ................ 1-192658

[51] Int. Cl.⁵ .......................... G06F 3/00
[52] U.S. Cl. ................... 395/550; 395/775; 364/949.5; 364/950.3; 364/926.9; 364/DIG. 2
[58] Field of Search ... 364/200 MS File, 900 MS File, 364/DIG. 1 MS File, DIG. 2 MS File; 395/550, 775, 275, 800, 375; 340/825.06, 825.14; 370/100.1, 105.2

[56] References Cited

U.S. PATENT DOCUMENTS

| | | | |
|---|---|---|---|
| 3,772,659 | 11/1973 | De Vries | 364/200 |
| 4,222,103 | 9/1980 | Chamberlin | 364/200 |
| 4,253,141 | 2/1981 | Suzuki et al. | 364/104 |
| 4,259,719 | 3/1981 | Edelman et al. | 364/200 |
| 4,287,558 | 9/1981 | Nishitani | 364/200 |
| 4,516,202 | 5/1985 | Kadowaki | 364/200 |
| 4,628,434 | 12/1986 | Tashiro et al. | 364/130 |
| 4,773,002 | 9/1988 | Iwasaki et al. | 364/200 |
| 4,814,976 | 3/1989 | Hansen et al. | 364/200 |
| 4,970,679 | 11/1990 | Tachibana | 364/900 |

FOREIGN PATENT DOCUMENTS 63-295974 12/1988 Japan .

*Primary Examiner*—Michael R. Fleming
*Assistant Examiner*—Gopal C. Ray
*Attorney, Agent, or Firm*—Foley & Lardner

[57] ABSTRACT

A pulse input device has a standard time generator for outputting standard time information by counting a system clock signal; an input circuit for sampling input signal information from a plurality of channels in synchronization with the standard time information at a predetermined period; a memory for storing the input signal information sampled by the input circuit; a command memory for storing a plurality of instruction commands; and a controller for scanning the instruction commands stored in the command memory to successively execute the instruction commands, for repeating the scanning operation of the instruction commands, and for controlling operations of the device. The controller outputs a designation signal having a period of a predetermined time for designating an execution starting time obtained by counting the system clock signals, so that the period of the execution starting time for each of the instruction commands becomes a constant rate in the successive command scanning operation for successively executing each of the instruction commands in synchronization with the designation signal, and the period of the predetermined time is set based on the instruction command having the longest execution time.

5 Claims, 23 Drawing Sheets

FIG.15A

— : MEANINGLESS VALUE

| INPUT SIGNAL 1 | TIME 0 | — | — | — | — |
|---|---|---|---|---|---|
| INPUT SIGNAL 2 | TIME 0 | — | — | — | — |

STATE DURING TIME 0 ~ TIME 7

FIG.15B

| INPUT SIGNAL 1 | TIME 8 | TIME 0 | — | — | — |
|---|---|---|---|---|---|
| INPUT SIGNAL 2 | TIME 8 | TIME 0 | — | — | — |

STATE DURING TIME 8 ~ TIME 15

FIG.15C

| INPUT SIGNAL 1 | TIME 16 | TIME 8 | TIME 0 | — | — |
|---|---|---|---|---|---|
| INPUT SIGNAL 2 | TIME 16 | TIME 8 | TIME 0 | — | — |

STATE DURING TIME 16 ~ TIME 23

FIG.15D

| INPUT SIGNAL 1 | TIME 24 | TIME 16 | TIME 8 | TIME 0 | — |
|---|---|---|---|---|---|
| INPUT SIGNAL 2 | TIME 24 | TIME 16 | TIME 8 | TIME 0 | — |

STATE DURING TIME 24 ~ TIME 31

FIG.15E

| INPUT SIGNAL 1 | TIME 32 | TIME 24 | TIME 16 | TIME 8 | TIME 0 |
|---|---|---|---|---|---|
| INPUT SIGNAL 2 | TIME 32 | TIME 24 | TIME 16 | TIME 8 | TIME 0 |

STATE DURING TIME 32 ~ TIME 39

FIG.15F

| INPUT SIGNAL 1 | TIME 40 | TIME 32 | TIME 24 | TIME 16 | TIME 8 |
|---|---|---|---|---|---|
| INPUT SIGNAL 2 | TIME 40 | TIME 32 | TIME 24 | TIME 16 | TIME 8 |

STATE DURING TIME 40 ~ TIME 47

FIG.15G

| INPUT SIGNAL 1 | TIME 48 | TIME 40 | TIME 32 | TIME 24 | TIME 16 |
|---|---|---|---|---|---|
| INPUT SIGNAL 2 | TIME 48 | TIME 40 | TIME 32 | TIME 24 | TIME 16 |

STATE DURING TIME 48 ~ TIME 55

FIG.15H

| INPUT SIGNAL 1 | TIME 56 | TIME 48 | TIME 40 | TIME 32 | TIME 24 |
|---|---|---|---|---|---|
| INPUT SIGNAL 2 | TIME 56 | TIME 48 | TIME 40 | TIME 32 | TIME 24 |

STATE DURING TIME 56 ~ TIME 63

FIG.15I

| INPUT SIGNAL 1 | TIME 64 | TIME 56 | TIME 48 | TIME 40 | TIME 32 |
|---|---|---|---|---|---|
| INPUT SIGNAL 2 | TIME 64 | TIME 56 | TIME 48 | TIME 40 | TIME 32 |

STATE DURING TIME 64 ~ TIME 71

FIG.16A

| COMMAND 0 | DETECTION OF RISING TIME OF INPUT SIGNAL 1 |
|---|---|
| COMMAND 1 | CALCULATION OF DIFFERENCE BETWEEN RISING TIME OF INPUT SIGNAL 1 AND RISING TIME OF INPUT SIGNAL 2 |
| COMMAND 2 | NOP |
| COMMAND 3 | NOP |
| COMMAND 4 | NOP |
| COMMAND 5 | NOP |
| COMMAND 6 | NOP |
| COMMAND 7 | NOP |

FIG.16B

| | |
|---|---|
| COMMAND 0 | NOP |
| COMMAND 1 | DETECTION OF RISING TIME OF INPUT SIGNAL 1 |
| COMMAND 2 | CALCULATION OF DIFFERENCE BETWEEN RISING TIME OF INPUT SIGNAL 1 AND RISING TIME OF INPUT SIGNAL 2 |
| COMMAND 3 | NOP |
| COMMAND 4 | NOP |
| COMMAND 5 | NOP |
| COMMAND 6 | NOP |
| COMMAND 7 | NOP |

| INPUT SIGNAL 1 | 0 | — | — | — | — |
| INPUT SIGNAL 2 | 0 | — | — | — | — |
| READINGS OF CHANGE INFORMATION | — | — | — | — | |

STATE DURING TIME 0 ~ TIME 7

| INPUT SIGNAL 1 | 1 | 0 | — | — | — |
| INPUT SIGNAL 2 | 1 | 0 | — | — | — |
| READINGS OF CHANGE INFORMATION | ↑ | — | — | — | |

STATE DURING TIME 8 ~ TIME 15

FIG.17D

| INPUT SIGNAL 1 | 1 | 1 | 0 | — | — |
|---|---|---|---|---|---|
| INPUT SIGNAL 2 | 1 | 1 | 0 | — | — |
| READINGS OF CHANGE INFORMATION | — | ↑ | — | — | |

STATE DURING TIME 16 ~ TIME 23

FIG.17E

| INPUT SIGNAL 1 | 0 | 1 | 1 | 0 | — |
|---|---|---|---|---|---|
| INPUT SIGNAL 2 | 0 | 1 | 1 | 0 | — |
| READINGS OF CHANGE INFORMATION | ↑ | — | ↑ | — | |

STATE DURING TIME 24 ~ TIME 31

FIG.17F

| INPUT SIGNAL 1 | 0 | 0 | 1 | 1 | 0 |
|---|---|---|---|---|---|
| INPUT SIGNAL 2 | 0 | 0 | 1 | 1 | 0 |
| READINGS OF CHANGE INFORMATION | — | ↑ | — | ↑ | |

STATE DURING TIME 32 ~ TIME 39

FIG.17G

| INPUT SIGNAL 1 | 0 | 0 | 0 | 1 | 1 |
|---|---|---|---|---|---|
| INPUT SIGNAL 2 | 0 | 0 | 0 | 1 | 1 |
| READINGS OF CHANGE INFORMATION | — | — | ↑ | — | |

STATE DURING TIME 40 ~ TIME 47

FIG.18A

| INPUT SIGNAL 1 | 0 | — | — | — | — | — |
|---|---|---|---|---|---|---|
| INPUT SIGNAL 2 | 0 | — | — | — | — | — |

READINGS OF
CHANGE INFORMATION — — — —

STATE DURING TIME 0 ~ TIME 7

FIG.18B

| INPUT SIGNAL 1 | 1 | 0 | — | — | — | — |
|---|---|---|---|---|---|---|
| INPUT SIGNAL 2 | 1 | 0 | — | — | — | — |

READINGS OF
CHANGE INFORMATION — — — —

STATE DURING TIME 8 ~ TIME 15

FIG.18C

| INPUT SIGNAL 1 | 1 | 0 | — | — | — | — |
|---|---|---|---|---|---|---|
| INPUT SIGNAL 2 | 1 | 0 | — | — | — | — |

READINGS OF
CHANGE INFORMATION ↑ — — —

STATE DURING TIME 8 ~ TIME 15

FIG.18D

| INPUT SIGNAL 1 | 1 | 1 | 0 | — | — | — |
|---|---|---|---|---|---|---|
| INPUT SIGNAL 2 | 1 | 1 | 0 | — | — | — |

READINGS OF
CHANGE INFORMATION — ↑ — —

STATE DURING TIME 16 ~ TIME 23

FIG.18E

| INPUT SIGNAL 1 | 0 | 1 | 1 | 0 | — | — |
|---|---|---|---|---|---|---|
| INPUT SIGNAL 2 | 0 | 1 | 1 | 0 | — | — |
| READINGS OF CHANGE INFORMATION | ↑ | — | ↑ | — | | |

STATE DURING TIME 24 ~ TIME 31

FIG.18F

| INPUT SIGNAL 1 | 0 | 0 | 1 | 1 | 0 | — |
|---|---|---|---|---|---|---|
| INPUT SIGNAL 2 | 0 | 0 | 1 | 1 | 0 | — |
| READINGS OF CHANGE INFORMATION | — | ↑ | — | ↑ | | |

STATE DURING TIME 32 ~ TIME 39

FIG.18G

| INPUT SIGNAL 1 | 0 | 0 | 0 | 1 | 1 | 0 |
|---|---|---|---|---|---|---|
| INPUT SIGNAL 2 | 0 | 0 | 0 | 1 | 1 | 0 |
| READINGS OF CHANGE INFORMATION | — | ↑ | — | ↑ | | |

STATE DURING TIME 40 ~ TIME 49

FIG.18H

| INPUT SIGNAL 1 | 0 | 0 | 0 | 1 | 1 | 0 |
|---|---|---|---|---|---|---|
| INPUT SIGNAL 2 | 0 | 0 | 0 | 1 | 1 | 0 |
| READINGS OF CHANGE INFORMATION | — | — | ↑ | — | | |

STATE DURING TIME 40 ~ TIME 47

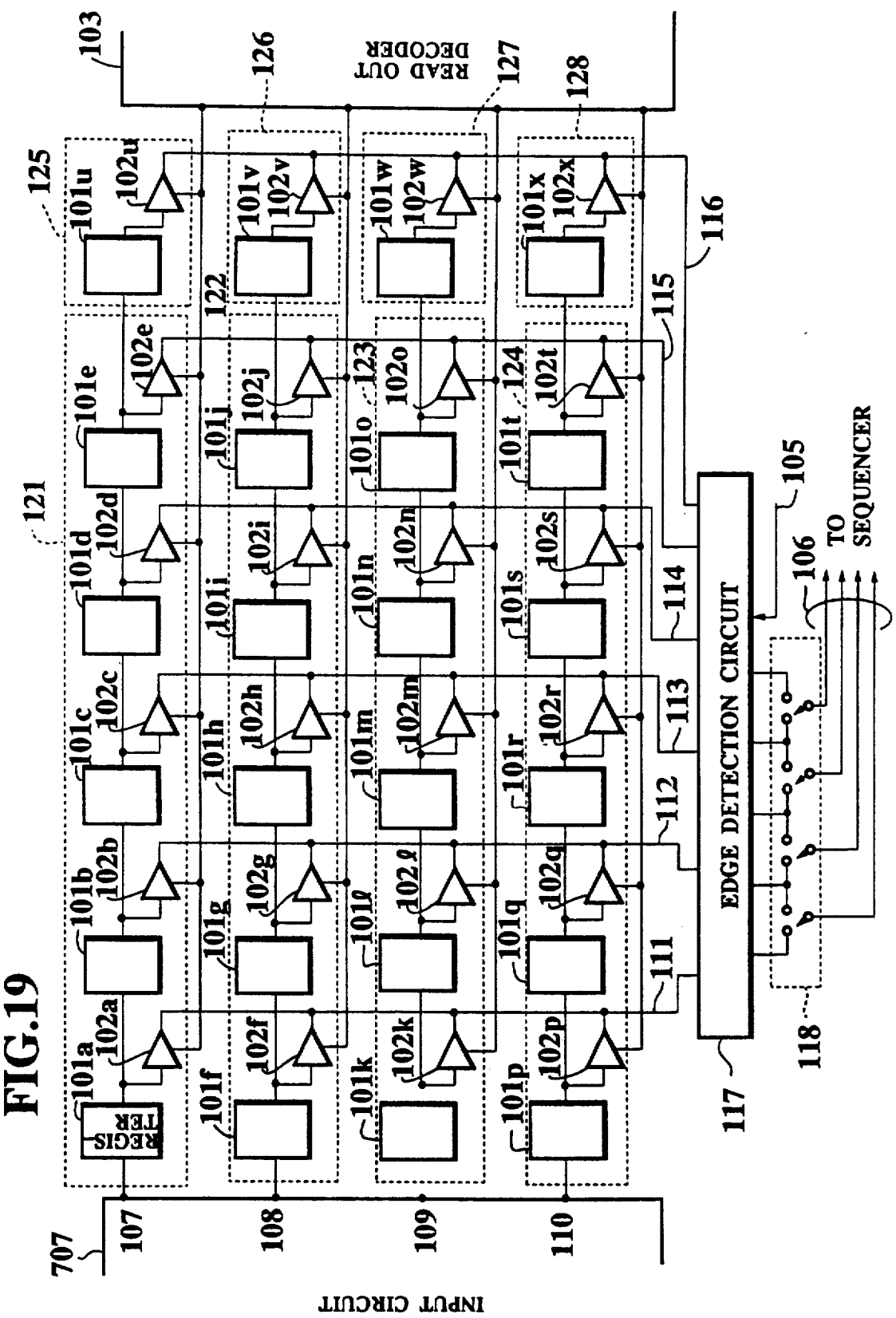

DIGITAL PULSE TIMING PARAMETER MEASURING DEVICE

BACKGROUND OF THE INVENTION

1. Field of the Invention

The present invention relates to a pulse input device, and particularly to construction of an input memory for temporarily storing information on past records of input signals and construction of a sequencer.

2. Description of the Prior Art

A pulse input device receives signals outputted from a plurality of external machines and tools, and detects change of these signals or, events and times on which these signals are changed, or event times, (hereinafter these are called "Input Information"), then outputs them to the CPU.

The pulse input device in combination with a control device detects operational states of various machines.

A conventional pulse input device of this sort, is disclosed in Japanese Patent Laid-Open Specification No. 63-295974. FIG. 1 is a schematic construction diagram of the pulse input device disclosed in the literature. In this diagram, signals outputted from external machines and tools (not shown) are inputted to an input circuit 707 as input signals 704. The input circuit 707 samples the input signals 704 at predetermined periods, then outputs them to a input memory 708. The input memory 708 temporarily stores input information sampled at predetermined times. A command memory 705 mainly stores a plurality of instruction commands (hereinafter they are called "Commands") and process results.

These commands are instructions for operating a pulse input device 701. Incidentally, rewriting of the commands in the command memory 705 is carried out by a CPU 703 through a bus 702. A timer counter 706 outputs standard time information. Moreover, a sequencer 709 scans in the command memory 705, and reads the plurality of commands successively, then executes these commands. The sequencer 709 controls the pulse input device 701 over all. As shown by a portion in a frame of a dotted line in FIG. 1, the pulse input device 701 comprises the input circuit 707, input memory 708, command memory 705, sequencer 709 and timer counter 706.

FIG. 2 is a schematic construction diagram of the sequencer 709 shown in FIG. 1. In FIG. 2, a program counter 710 designates addresses stored in the command memory 705, and a command register 712 temporarily stores a command corresponding to a content of the address designated by the program counter 710. A controller 713 decodes a command stored in the command register 712. Moreover, an arithmetic circuit 711 executes a calculation between a standard time information and an input signal information stored in the input memory 708. Namely, as shown by a portion in a frame of a dotted line in FIG. 2, the sequencer 709 is composed of the program counter 710, the command register 712, the controller 713 and the arithmetic circuit 711.

Next, in operation of the conventional pulse input device having the construction as described above, problems on construction and operation of the sequencer 709 will be described.

FIG. 3 is a flowchart of operational procedures when the sequencer 709 in the pulse input device processes commands. FIG. 4 is a timing chart illustrating when the sequencer 709 executes the commands. In FIG. 3, steps shown by rectangular frames, S1, S3, S5, S6, S7, S9, S11 and S12 require one system clock to be executed, respectively. Moreover, steps shown by diamond-shaped frames such as S2, S4, S8 and S10 are executed in combination with the steps S1, S3, S7 and S9, respectively. Accordingly, one system clock is required for each of these combination steps (S1 and S2, S3 and S4, S7 and S8, and S9 and S10) to be executed. Furthermore, in the command memory 705, six commands, CMD1 through CMD6, are stored.

The sequencer 709 scans in the command memory 705 and successively reads the commands stored therein. For the execution of the commands, the input signal information in the input memory 708 is optionally read. The arithmetic circuit 711 carries out the operation on the standard time information and input signal information read from the input memory 708. Then, the operation result obtained is outputted to the command memory 705. The operation as described above is repeated. Moreover, the sampling of the input signal 704 is carried out at every period of a sampling clock of predetermined periods. The sampling period is independent of a period in the command execution.

The time required for execution of an EGDE command as shown in FIG. 3 depends on the existence of an event at step S4. When the event is found, the execution required 4 system clocks at the steps S1 and S2, S3 and S4, and S5 and S6. and when not found, the execution requires 3 system clocks at the steps S1 and S2, S3 and S4, and S12. At the same time, a time required for execution of a WIDTH command as shown in FIG. 3 depends on the existance of an event at the step S8 and the suitability of a time when the event occurs. When the occurrence time is suitable, the execution requires 4 system clocks at the steps S1 and S2, S7 and S8, S9 and S10, and S11, and when the event is not found, the execution requires 3 system clocks at S1 and S2, S7 and S8, and S12.

Even when the same command is executed, the number of system clocks required depends on the flow of process, thus the execution of successive commands cannot be carried out at a constant period. To the contrary, the sampling of the input signals 704 is carried out at predetermined period. Accordingly, when an instruction whose execution time is short because of the process flow of command, for example, a command such as NOP is executed successively, it is difficut to keep a constant relation between the sampling period of input signals and the execution start time of command. Namely, it is possible that the reading of the input signal information is executed before the sampling is executed predetermined times. In this case, since the input signal information already sampled predetermined times is read at a time, the information read may overlap.

To solve the above mentioned problem, as shown in FIG. 4, command scan start signals inputted at predetermined periods are used to start the command scan in response to the signals. Namely, in the command scan method, commands are started not successively, but in response to the command scan start signals. In this case, it is possible to keep a constant relation on time between the sampling period of the input signals and the period of the command scan start signals. However, when command rewriting in the command memory is carried out, the command scan start time is shifted between commands before and after the rewriting process. Moreover, the shift causes misreading or overlapped reading so that it is difficult to carry out correct reading.

FIG. 5 is a diagram to show a case in which information in the input memory is overlooked in reading by the rewriting of commands. In the same drawing, four kinds of input signal information, respectively sampled at a time designated by ☆ 1, are read by the execution of a command ④ in the n-th command scanning. These four kinds of input signal information are sampled after the start of execution of the command ④ in the (n−1)th command scanning. Next, in the (n+1)th command scanning, a command ③ is rewritten into a command requiring a longer execution time than that of the command ③ in the n-th command scanning, for example, EDGE command. Accordingly, since a start time of execution of the command ④ in the (n+1)th command scanning is later than a start time thereof in the n-th command scanning, four kinds of input signal information are read at a time designated by ☆ 2 when the command ④ is executed in the (n+1)th command scanning. As the result, input signal information sampled at a time designated by ☆ 3 is overlooked in reading.

FIG. 6 is a diagram to show a case in which input signal information is read overlappedly by rewriting commands. In the same drawing, four kinds of input signal information designated by ☆ 1 are read in execution of a command ④ in the n-th command scanning. The four kinds of input signal information are sampled after execution of the command ④ in the (n−1)th command scanning.

Next, in the (n+1)th command scanning, a command ③ is rewritten into a command requring a shorter execution time than that of the command ③ in the n-th command scanning, for example, NOP command. By the rewriting, an execution start time of the command ④ based on a start time of the command scanning in the (n+1)th command scanning becomes earlier then an execution start time of the command ④ based on a start time of command scanning of the command ④ in the n-th command scanning. Accordingly, in the execution of command ④ of the (n+1)th command scanning, three kinds of input signal information designated by ☆ 2 and input signal information (★1) sampled at the latest time in the input signal information designated by ☆ 1 are read. The input signal information designated by ☆ 1 and ★ 1 is already read at a time of the n-th command scanning. Accordingly, the input signal information is read overlappedly from the input memory. To solve these problems, start times at which the respective commands are executed are written into the command memory, and input signal information which is sampled after execution of the previous command is selected by using the information on the start times written so as to read only the input signal information selected. However, in this method, it is necessary to write values of a timer counter into the command memory at every end of the command execution, so the process becomes complicated. Moreover, in reference to the input memory, it is necessary to limit a range of an effective time for the reading, so the process becomes more complicated. Accordingly, the execution time takes a long time; further, the capacities of the command memory and input memory must be enlarged to write these time information values therein. In some timing, it is probable that the reference to the input memory and the writing to the input memory are carried out in the same clock cycle. Thus, a more complicated process must be required for the pulse input device to read correct input signal information.

Next, problems on construction and operation of the input memory in the conventional pulse input device will be described.

The input circuit 707 samples the input signals 704 at predetermined periods, and detects change thereof, thereafter outputs them as input information to the input memory 708. The sampling is carried out based on a sample clock made by dividing a clock having a predetermined period. The period of the sample clock coincides with the period in which the timer counter is renewed.

In the command memory 705, a plurality of commands for designating input channel numbers and polarities in the signal change (rising edge or falling edge) are contained. Moreover, time information of the signal change as input information obtained by executing the commands is written in predetermined positions respectively. The CPU 703 receives an interrupt signal from the pulse input device, and watches a content of commands stored in the command memory 705 periodically to know a plurality of event times. Moreover, the CPU 703 makes the command memory 705 store a plurality of commands, so as to correctly input the input information even when a plurality of events are generated together in a short time. Incidentally, the CPU 703 and the pulse input device 701 can be operated independently.

The, the sequencer 709 reads the plurality of commands written in the command memory 705 successively, and repeats the series of processes (command scanning). In the command execution, the contents of the input memory 708 corresponding to a channel designated by the command is referred to, and change of the contents is examined, then an operation required is carried out. Thereafter, the operation result is outputted to the command memory 705. Accordingly, the sequencer 709 can detect changes of input signals generated in a time length (hereinafter, this time is called "Command Execution Interval") from execution in command scanning of this time to execution in command scanning of next time by referring to the input memory.

The input memory 708 stores information on the change of input signals sampled in a time corresponding to the command execution interval. Respective commands are executed at constant intervals in a series of command scanning. Accordingly, the information on input signals sampled in the command execution interval is stored in the input memory 708.

The input memory 708 requires 2 bits to store the change information for one sampling in input signals of one channel. Namely, the following three cases:

(1) change from 0 to 1,
(2) change from 1 to 0, and
(3) no change(from 0 to 0 or from 1 to 1)

are considered as the change information obtained by one sampling. Therefore, the number of storage elements required for the input memory is markedly increased. Moreover, the input memory 708 is accessed by both the sequencer 709 and input circuit 707. When the input circuit 707 outputs input information anew, contents or input information stored in the input memory 708 are renewed. The renewal time is not in synchronism with the reading time on which the sequencer 709 executes commands and refers to the input memory. Therefore, the sequencer occasionally cannot obtain correct input information by some timing of the reference. Particularly, this problem is caused when the input memory is renewed and referred to many times while the same command or a plurality of commands are processed in combination as in the phase difference measurement or pulse width measurement.

To solve the problem, there is a conventional device of this sort which includes two input memories, for example, 801 and 802 as shown in FIG. 7. According to the construction, it is possible that the input circuit 707 outputs input information to the input memory 802 while the sequencer 709 refers to the input memory 801 as shown by solid lines in FIG. 7. Thereafter the input circuit 707 outputs input information to the input memory 801 while the sequencer 709 refers to the input memory 802 as shown by broken lines in FIG. 7. In this case, a switching time of the memories is equal to a start time of command scanning in the sequencer 709. Thereby, it can be possible to refer to the same input memory while the same command is scanned. Accordingly, the input information is not mistakenly inputted by the execution order of commands and the execution timing of the sequencer 709, so that a correct result can be obtained even when the same memory is referred to many times.

However, the input memory having the so-called double buffer structure as mentioned above has problems as follows. First, it takes a relatively long time to detect the change of input signals. Namely, the detection delay is markedly large. For example, each input signal is sampled in eight clocks, each command is executed in four clocks, and eight commands are written in the command memory 705. In this case, a time required for one command scanning, i.e., an execution time for all the commands, is 32 clocks.

During the time, the input signals 704 are sampled four times. Namely, it is necessary that the two input memories 801 and 802 accumulate the change information of input signals for four samples respectively. Thus, the number of storage elements required is 16 bits per channel.

At a time 0 (the time gains 1 a clock), the sequencer 609 starts to scan the command memory 705 so as to execute the first command. At the time, the sequencer 709 refers to the input memory 801, and the input circuit 707 outputs data to the input memory 802. At a time of 31, the sequencer 709 completes execution of the eight commands. At a time 32, the input memory 802 is switched to be referred to, next command scanning is started. At the same time 32, the input circuit 707 outputs data to the input memory 801. Next, the detection delay on signal change generated at the time 1 is obtained. Since the input circuit 707 samples the input signals every eight clocks, the signal change generated at the time 1 is contained in the input memory 802 at a time 8. Then, until the time 31, since the sequencer 709 refers to the input memory 801, the signal change in the input memory 802 is not referred to by the sequencer 708. Thereafter, the signal change is referred to by the sequencer 709 at the time 32, but detection delay is generated by execution order of scanning a command for detecting the change. The worst case is that the command is to be executed last in the command scanning. In this case, the command is executed at a time 60. Accordingly, the detection delay from when the signal change is generated to when the change is detected reaches 59 clocks.

As stated above, in the double buffer method, the detection delay becomes at the maximum a value about twice of 32 clocks for which the sequencer 709 refers to the input memory. Moreover, a large scale capacity is required for the input memory. Namely, at the time 0, input information is contained in the input memory 801. However, all the data in the input memory 802 except data contained therein at the time 0 are useless because they are thrown away between the time 8 to 24. Since, the input memory contains such useless data, the capacity must be increased. Since the command execution interval for one command by the sequencer 709 is 32 clocks, ideally, the capacity of the input memory stores data for four times. However, as explained above, an approximately twice input memory capacity is required in the double buffer method.

With with respect to the sequencer in the conventional pulse input device, since the command execution time is changed by rewriting commands in the command memory, overlooked reading or overlapped reading of input signals results. Therefore, it is difficult to obtain correct input information.

With respect to the input memory in the conventional pulse input device, since the memory stores change information of input signals, the storage capacity must be increased. Moreover, in some case, it is impossible to obtain correct input signal information when the input memory is referred to many times during execution of the same command. Though the pulse input device of double buffer method provided with two input memories is used to solve the problem, the detection delay caused on detecting the input signal change by the sequencer is so large. Moreover, the capacity required for the input memory must be increased.

SUMMARY OF THE INVENTION

The present invention has been made to solve the problems in the prior art. With respect to the problem concerning the sequencer, it is an object of this invention to provide a pulse input device with high reliability, which can prevent the overlooking and the overlapping of input data by successively executing commands at a predetermined period regardless of kinds of commands.

With respect to the input memory problem, it is an object of this invention to provide a pulse input device with high reliability, which can prevent data from being overlook, reduce the detection delay and obtain correct input signal information, further reducing storage capacity.

To achieve the objects as mentioned above, a pulse input device according to the present invention comprises standard time generation means for outputting standard time information by counting system clock signals, input means for sampling input signal information from a plurality of channels in synchronism with the standard time information at predetermined periods, input storage means for storing the input signal information sampled predetermined times, command storage means for mainly storing a plurality of instruction commands; and control means for scanning the instruction commands in the command storage means to successively execute the instruction commands, repeating the scanning of the instruction commands, and controlling operations of the device, wherein the control means has a capability by which a period of the execution starting time of each instruction commands in the successive scanning is a constant rate.

In a specific embodiment of the present invention, a period of the execution starting time of each of the instruction commands in the successive scanning becomes a constant rate.

For example, the sequencer generates designation signals for designating a starting time of execution of each of the instruction commands at constant periods so that the execution of the command is started in response to the designated signal.

Moreover, a step for adjusting the command execution time and generating no operation to the pulse input device is used to end each command execution in a constant period.

Accordingly, a length of the execution time of each command becomes constant irrespective of kinds or states of the commands. As the result, even though contents of the command memory are rewritten during operation of the pulse input device, the input signal information is correctly read out into the sequencer without overlapping or overlooking itself.

Thereby, the sequencer is operated so that the execution of each command scanning next to each other is started at a constant period irrespective of the number of times of scanning.

Accordingly, it is possible to prevent overlooking or read overlapping input signal information, so that scales of the input memory and command memory can be reduced. Moreover, when the period for sampling the input signal is longer than a time corresponding to the number of system clocks required for the command execution, the sequencer is operated so that the reading of input signal information into the sequencer by command execution and the writing of input signal information into the input memory by sampling operation are not carried out at the same time.

Accordingly, the complicated process as a countermeasure to the overlap of a time for reading the input signal information into the sequencer and a time for writing the input signal information into the input memory can be eliminated. Thus, a pulse input device with high reliability and of low-cost can be obtained.

Moreover, another pulse input device according to the present invention comprises input means for sampling signals from a plurality of channels at predetermined periods, input storage means for storing input signal information sampled predetermined times, command storage means for mainly storing a plurality of instruction commands, and instruction command execution means for successively reading and executing the plurality of instruction commands by scanning the instruction commands stored in the command storage means, repeating the scanning of the instruction commands, controlling an execution time period of each of the instruction commands constantly in the successive command scanning, and correctly referring to contents of the input signal information on predetermined sampling in the input storage means even when the contents of the input storage means are renewed with sampled signals by the signal input means during an execution time of a process combined with one or more of the instruction commands, wherein the input means samples the input signal information predetermined times in the execution time period of each of the instruction command, and the input storage means has a capacity suitable for an amount of the input signal information corresponding to the total sum of sampling of the maximum number of times in the execution time period of the instruction commands and sampling of the maximum number of times in execution of the predetermined process of one or more of the instruction commands.

Still another pulse input device according to the present invention comprises signal input means for sampling signals from a plurality of channels at predetermined periods, input signal information storage means for storing states of signals or signal values sampled predetermined times by the signal input means, and instruction command means for mainly storing a plurality of instruction commands, and control means for scanning the instruction commands stored in the instruction command storage means, successively reading and executing the plurality of instruction commands, successively repeating the instruction command scanning, and controlling each command execution period in the same commands to be constant, further reading the signal values from the input signal information storage means and detecting change information of the signal values successively sampled.

Namely, the input signal information storage means has a storage capacity corresponding to the total input signal information both in the maximum times of sampling in the command scanning execution period and in the maximum times of sampling in execution of an instruction command combined with one or more of the instruction commands.

Accordingly, input signal information required can be referred to in a time less than the command scanning execution time irrespectively of kinds and execution timings of the instruction commands. Moreover, the same storage contents in the input signal information storage means can be correctly referred to even when the storage contents are referred to a plurality of times and renewed during execution of the instruction command combined with one or more of the instruction commands. Moreover, it is possible to compose the input signal information storage means with a shift register to contain the input signal values. In this case, the change of input signal values can be obtained by comparing each pair of bit arranged next to each other in the shift register. Since one input signal information is composed of one bit, the storage capacity of the input signal information storage means can be reduced.

Moreover, since the sequencer can refer to correct storage contents even when the storage contents in the input signal information storage means are referred to many times during execution of a group command combined with the one or more of instruction commands, a pulse input device with high reliability can be obtained.

These and other objects, features and advantages of the present invention will be more apparent from the following description of preferred embodiments, taken in conjunction with the accompanying drawings.

BRIEF DESCRIPTION OF THE DRAWINGS

FIG. is a schematic construction diagram of a pulse input device,

FIGS. 15A to 15I are diagrams to respectively show states of contents of the input memory storing input signals sampled in the fourth embodiment, FIGS. 16A and 16B are diagrams to respectively show command arrangement in a command memory, FIG. 17A is a wave-form diagram of input signals, FIGS. 17B to 17G are diagrams to respectively explain contents of an input memory and change information of input signals at sampling times.

FIGS. 18A to 18H are diagrams to respectively explain contents of an input memory and change information of input signals corresponding to a plurality of commands used in the embodiments of the present invention, and FIG. 19 is a constructional diagram of an input memory and an edge detection circuit both used in a fifth embodiment of the pulse input device in the present invention.

DETAILED DESCRIPTION OF THE EMBODIMENTS

Figure 1:
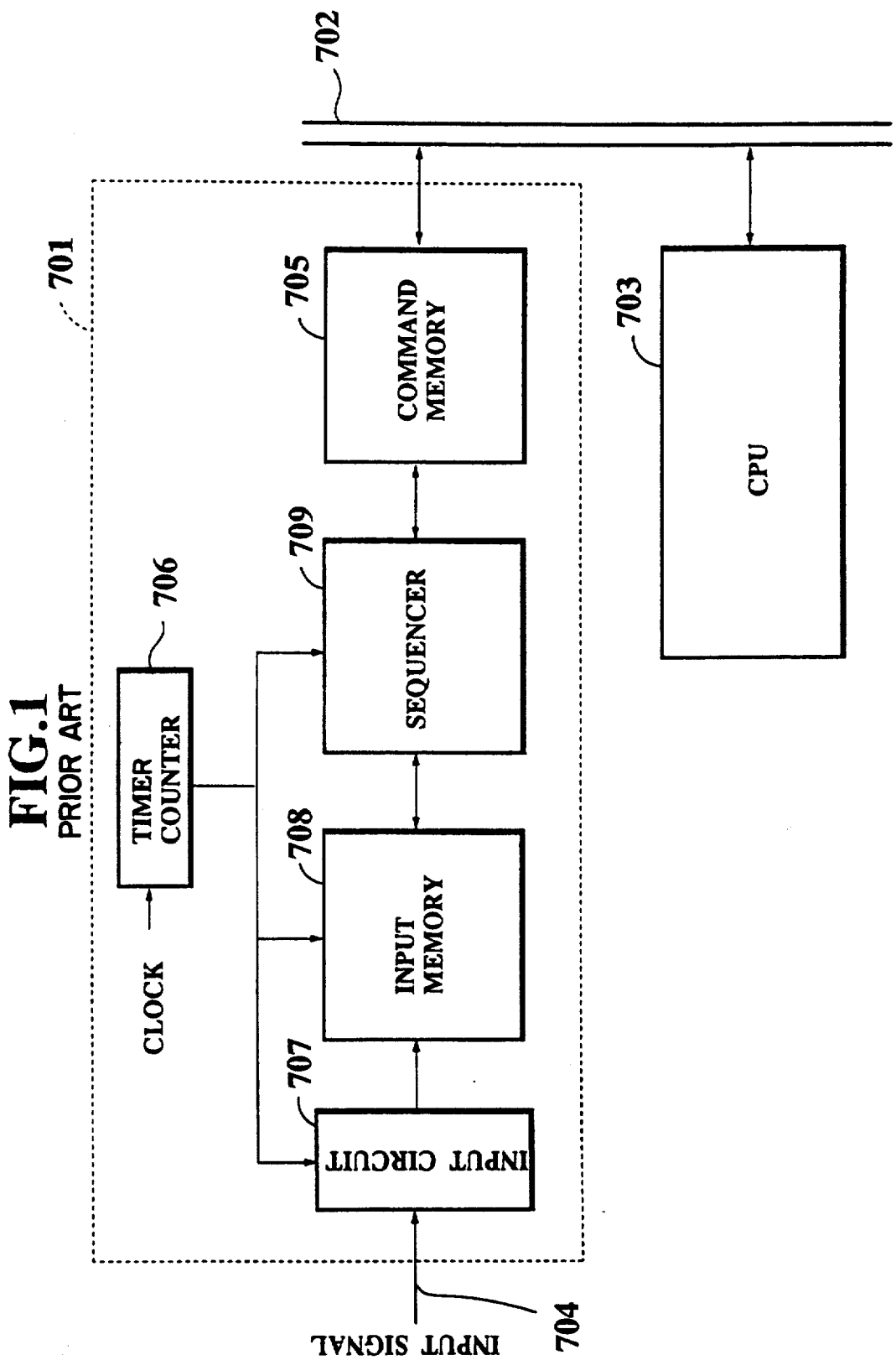
Figure 2:
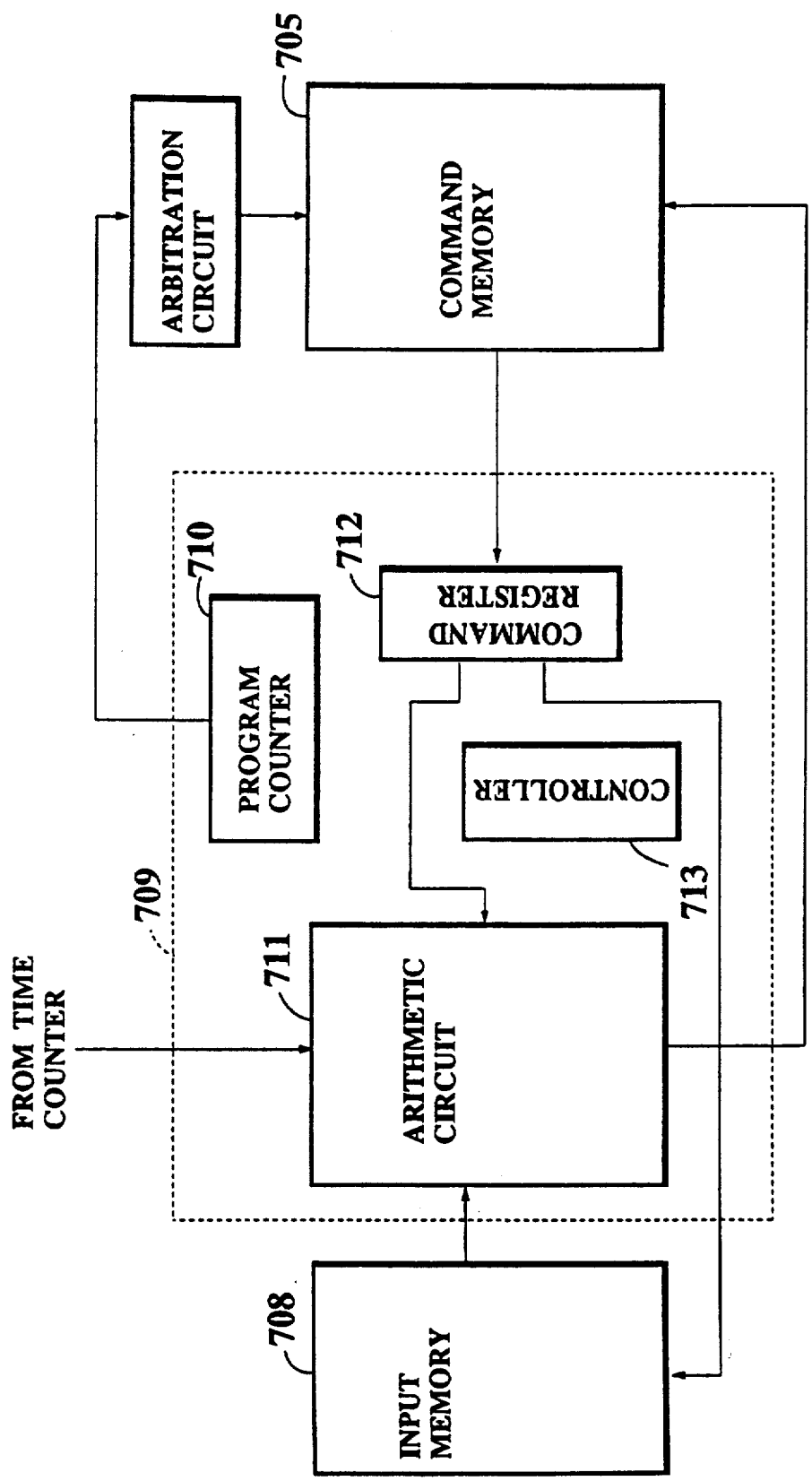
FIG. 2 is a schematic construction disgram of a sequencer used in the pulse input device shown in FIG. 1.
Figure 3:
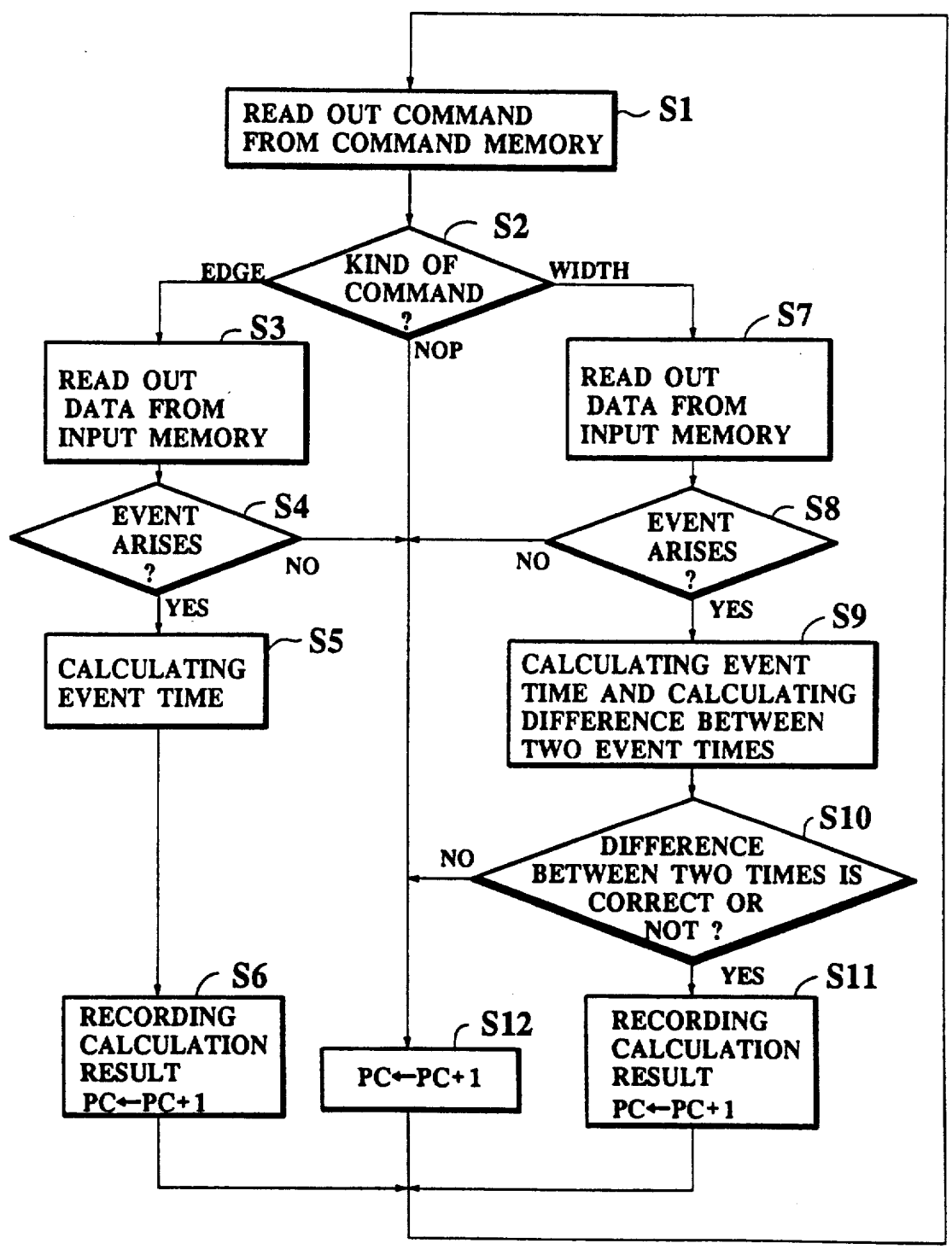
FIG. 3 is a flowchart to show an operational procedure of the sequencer in the pulse input device shown in FIG. 2.
Figure 4:
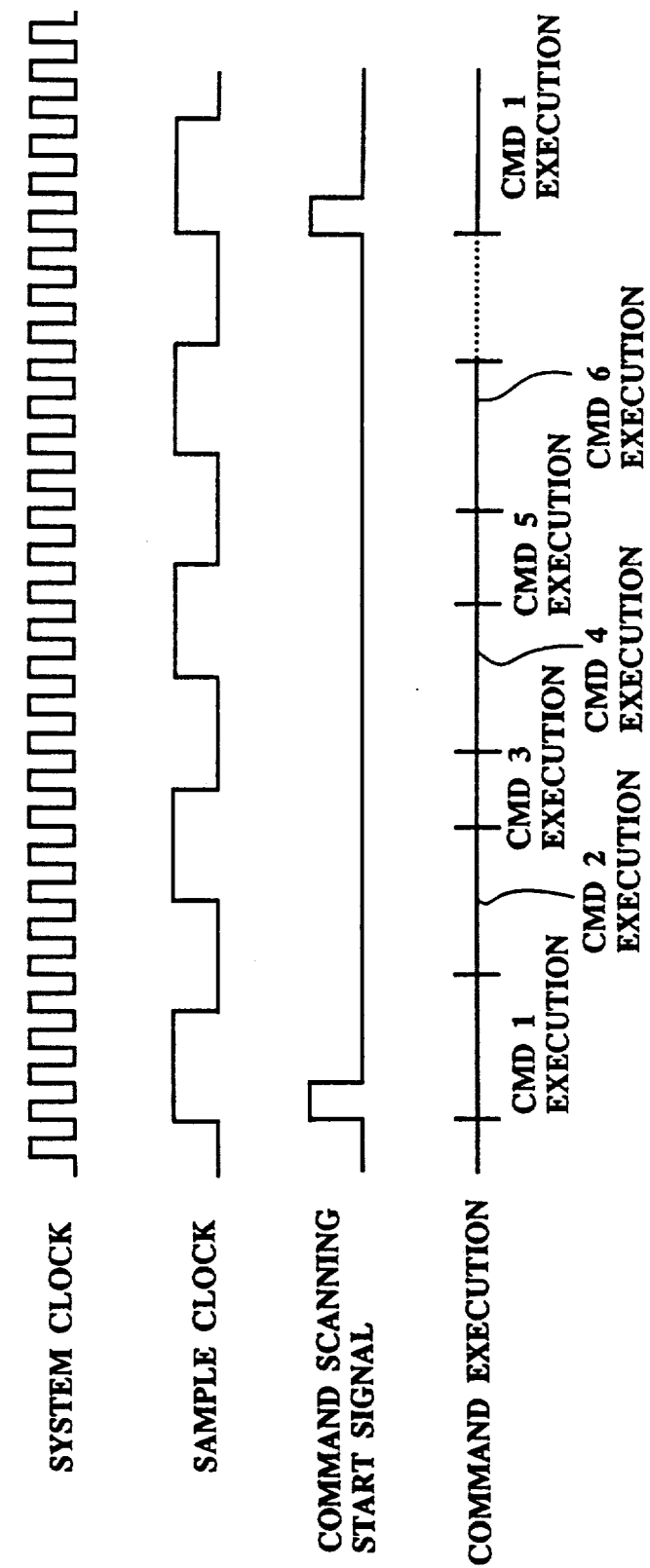
FIG. 4 is a timing chart to show an operation of the pulse input device shown in FIG. 1.
Figure 5:
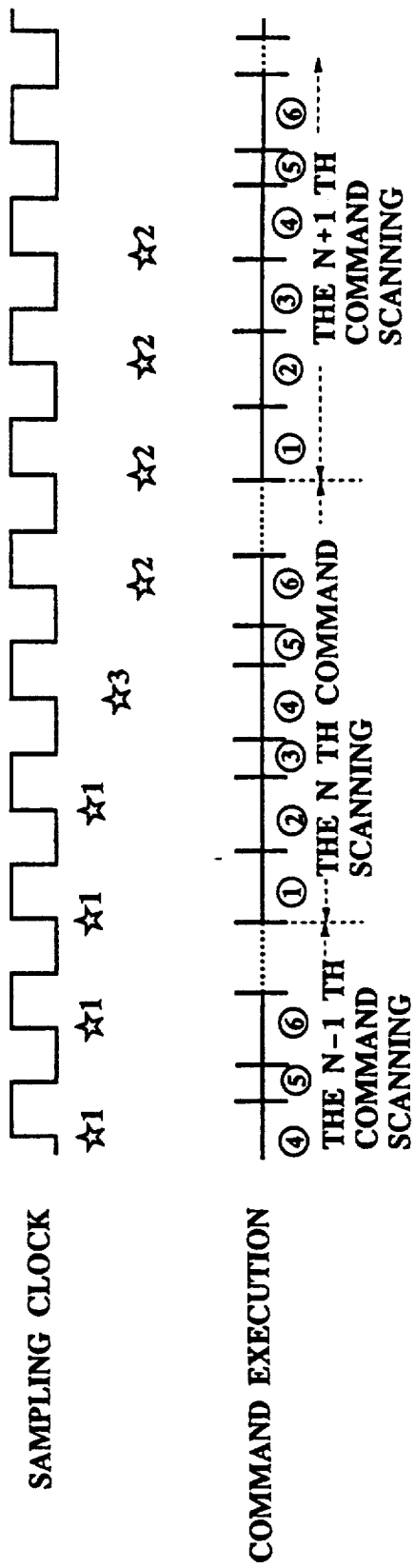
FIG. 5 is a timing chart to explain a case in which input signal information is overlooked in reading by rewriting commands in operation of the pulse input device in FIG. 1.
Figure 6:
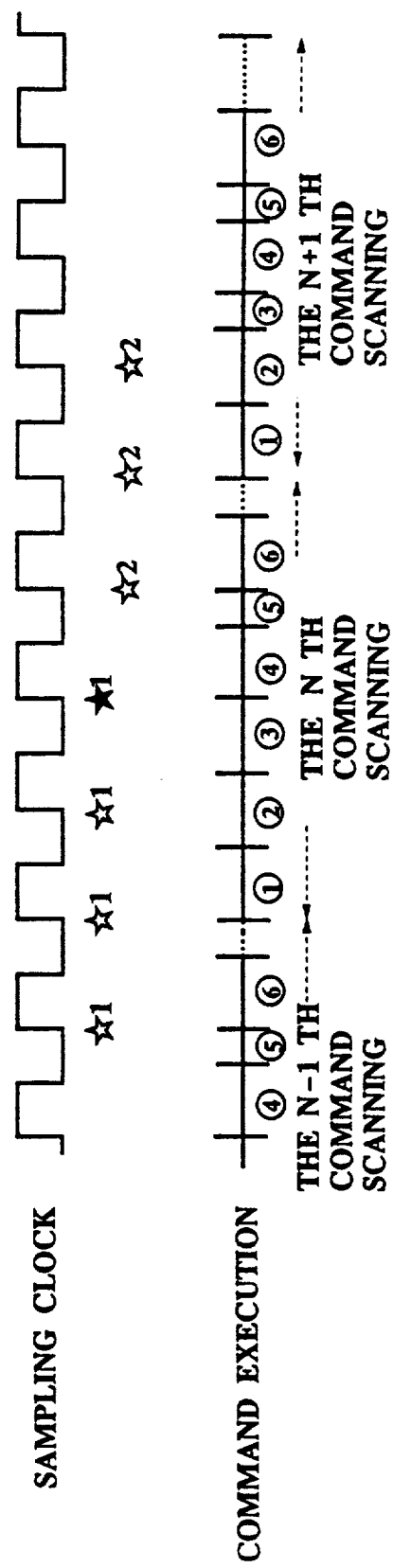
FIG. 6 is a timing chart to explain a case in which input signal information is overlapped in reading by rewriting commands in operation of the pulse input device in FIG. 1.
Figure 7:
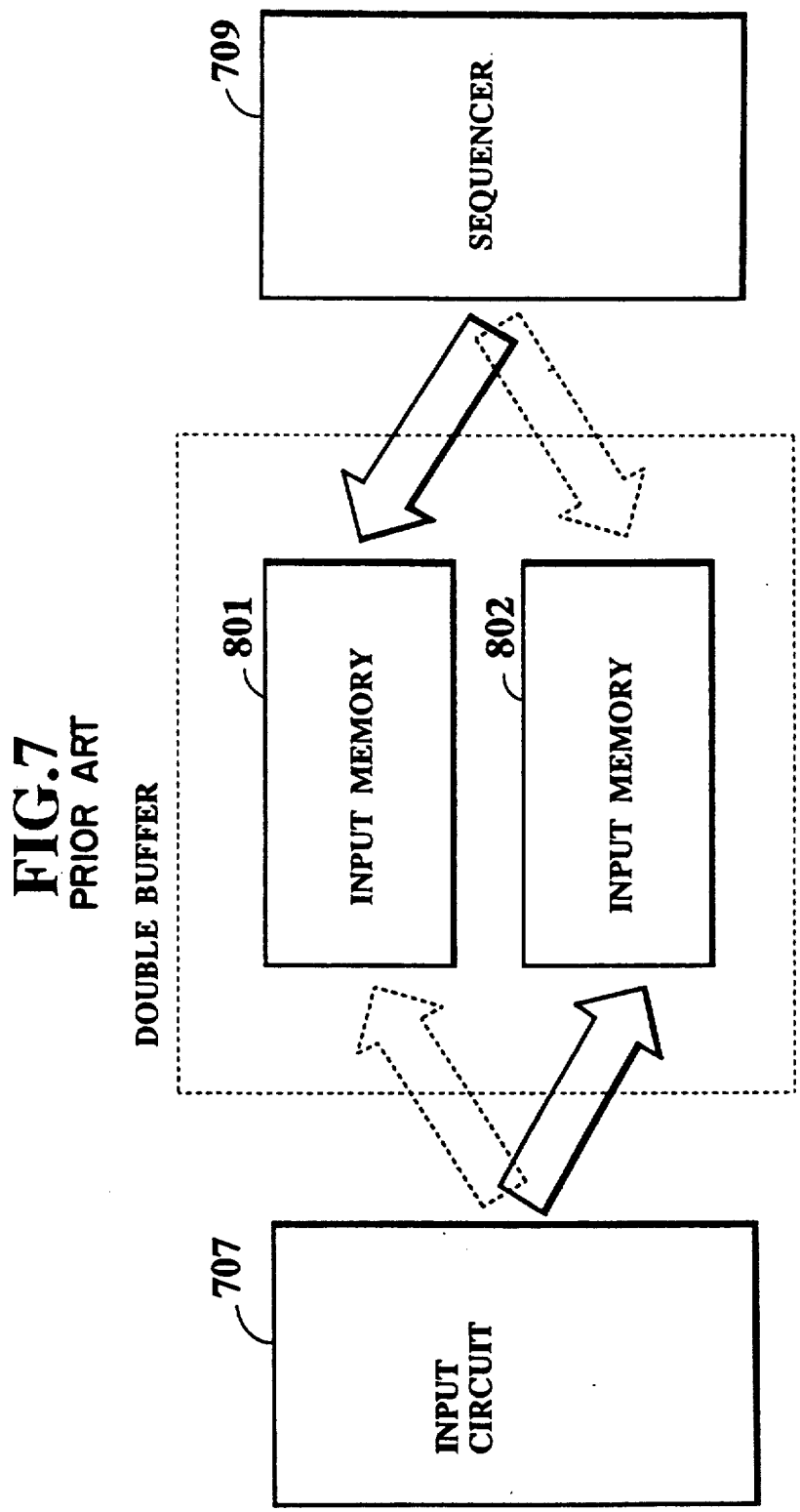
FIG. 7 is a constructional diagram of an input memory in a double buffer construction.
Figure 8:
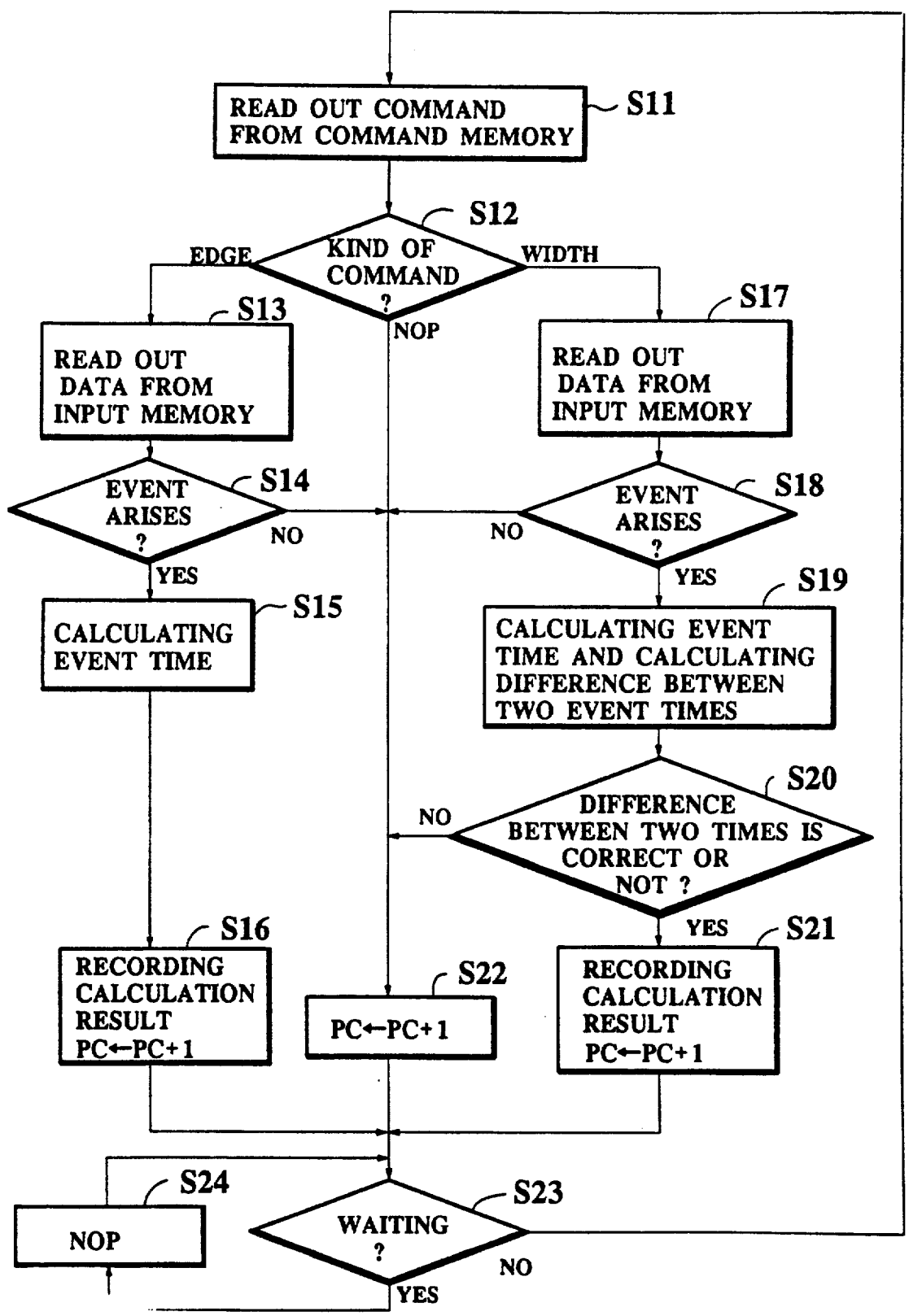
FIG. 8 is a flowchart to show a command execution procedure by a sequencer in a first embodiment of a pulse input device according to the present invention.
Figure 9:
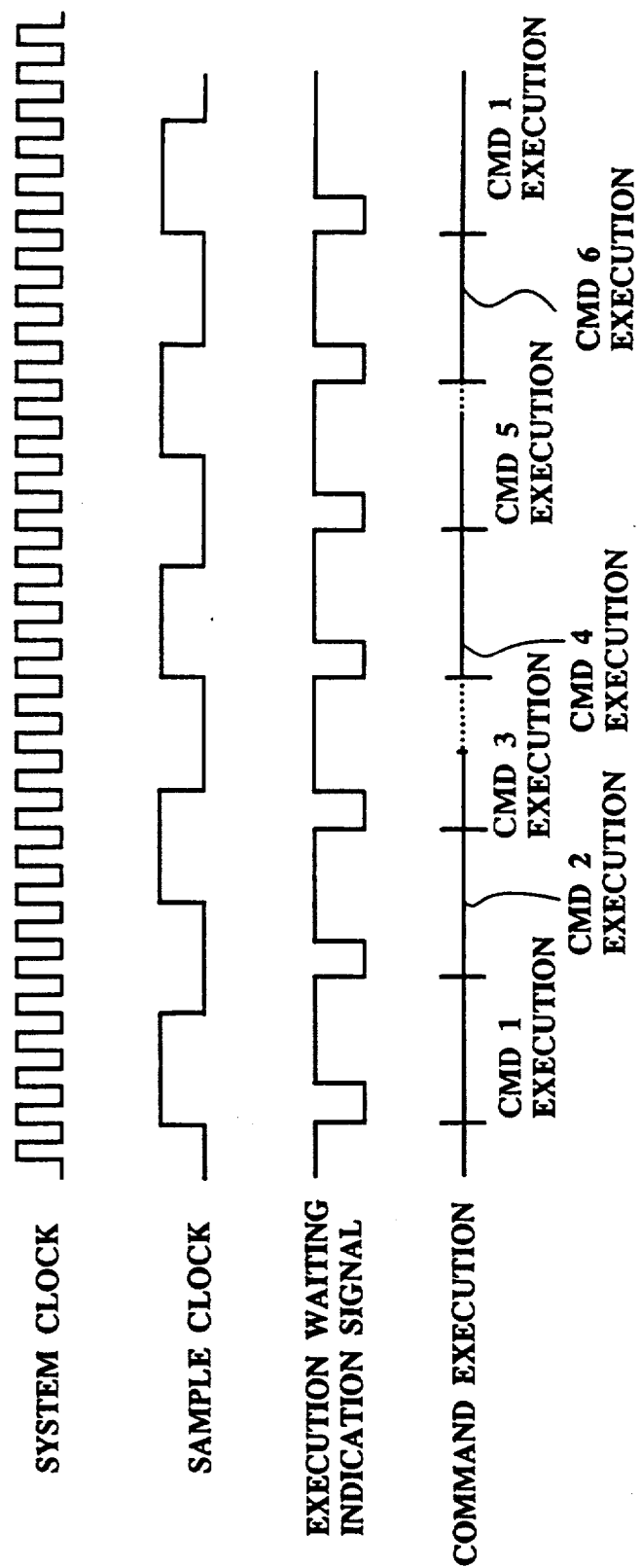
FIG. 9 is a timing chart to show an operation of the sequencer in the pulse input device of the first embodiment in FIG. 8.

Hereinafter, a first embodiment of a pulse input device according to the present invention will be explained with reference to FIGS. 8 to 12. FIG. 8 is a flowchart to show a command execution procedure of a sequencer in the pulse input device of the present invention. FIG. 9 is a timing chart to show an operation of the sequencer in the pulse input device in the embodiment as shown in FIG. 8. In the same drawings, the same constructional elements as those in the conventional example described above are designated by the same reference numerals or characters and not explained here. While, in the embodiment, signals for designating start wait of instruction command execution or execution start wait designation signals are introduced. These signals are repeatedly input into the sequencer 709 at constant periods. The signal is made by dividing the system clock. In the case of the pulse input device in the embodiment, since it is necessary that the execution start wait designation signals be generated every four system clocks, a 2-bit binary counter for counting the system clocks is used to utilize the logical sum of outputs obtained thereby.

Next, an operational procedure of the pulse input device in the embodiment is described. In FIG. 8, steps S11, S13, S15, S16, S17, S19, S21, S22 and S24, respectively expressed by rectangular frames, require one system clock for execution commonly. Steps S12 corresponding to S11, S14 to S13, S18 to S17, S20 to S19, and S23 to S21, S24, respectively expressed by diamond-shaped frames, require one system clock for execution commonly. For example, since NOP command adds only 1 to a value obtained by the program counter 701 in the step S22, two system clocks are required for execution of the command in the steps S11, S12 and S22.

The EDGE command requires four system clocks for execution when the event discovery is YES in the steps S11 and S12, S13 and S14, S15, S16 and S23. However, when the event discovery is NO, three system clocks are required for the execution in the steps S11 and S12, S13 and S14, and S22 and S23. In the same manner, with respect to WIDTH command, four system clocks are required for the execution when the event discovery is YES and the order suitability is YES in the steps S11 and S12, S17 and S18, and S19, S20, S21 and S23. When the event discovery is NO, three system clocks are required for the execution in the steps S11 and S12, S17 and S18, and S22 and S23.

In the embodiment, since a next command execution is started when the execution start wait designation signal is processed, for example, in execution of No Operation (NOP) command, the sequencer 709 judges whether the execution start wait designation signal is processed after the value of the program counter 701 is added with 1 or not in the steps S22 and S23. In this case, when the signal is not found, a process step for time adjustment is executed. Then, the sequencer 709 judges again whether the execution start wait designation signal is processed or not in the steps S24 and S23. When the signal is found in this stage, the command execution is completed, and a next command execution is carried out immediately in the steps S11 and S12.

Since the execution start wait signal and the step for time adjustment are introduced in the pulse input device of the embodiment, each command execution time becomes constant.

FIG. 9 is a timing chart to show a relation between the execution start wait designation signal and the command execution time in the pulse input device of the embodiment. In the same drawing, even though CMD 3 command execution is completed, CMD 4 command is not executed until arrival of a next execution time wait designation signal. The interval is expressed by a portion of a broken line. This phenomenon also appears in case of CMD 5 command and CMD 6 command. In this case, when a period of the execution start wait designation signal is adjusted at the longest command execution time, i.e., four system clocks, each command execution time becomes constant irrespective of kinds of commands. As the result, it becomes possible to prevent overlook or overlap in the input signal information reading.

Figure 10:
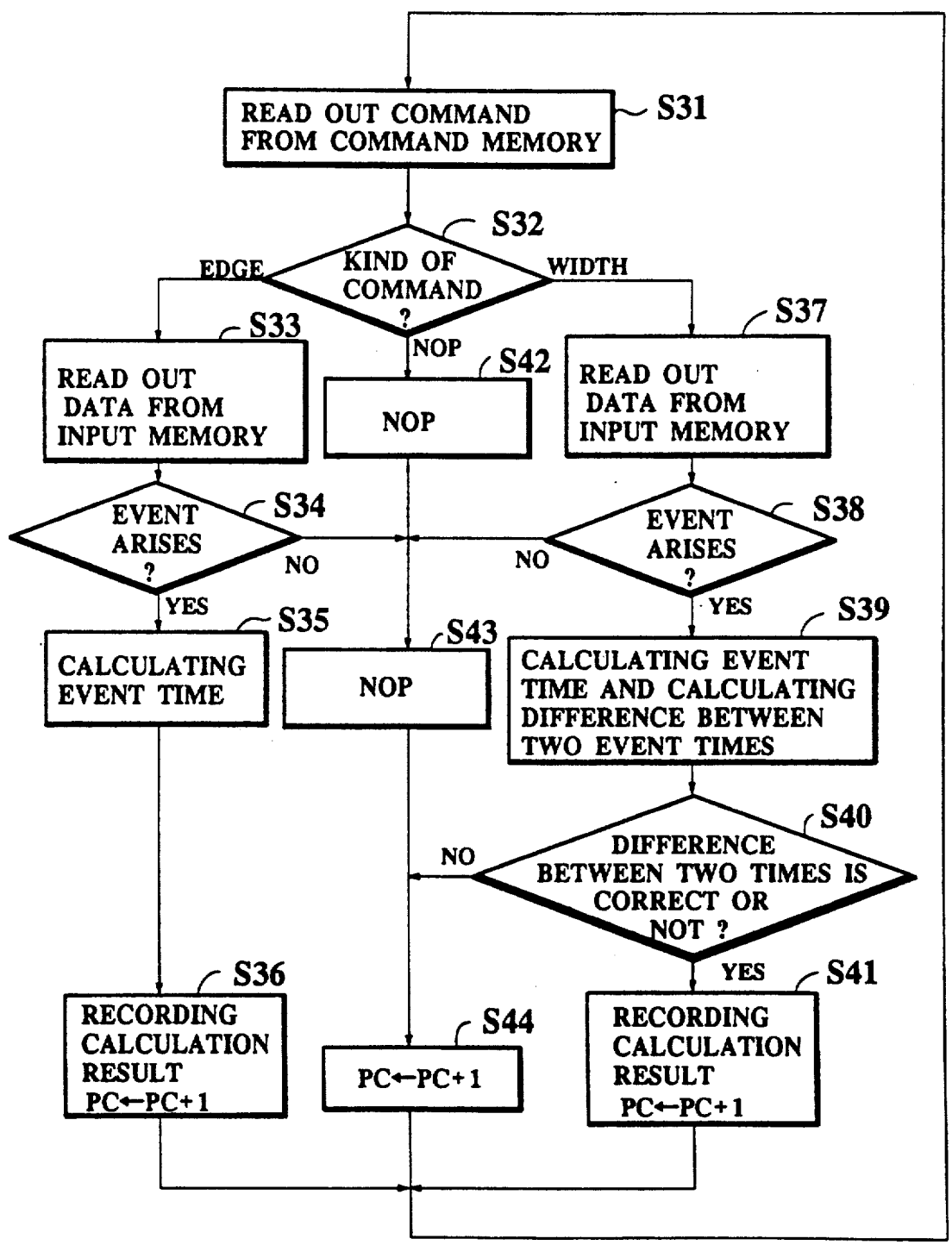
FIG. 10 is a flowchart to show a command execution procedure of a sequencer in a second embodiment of the pulse input device according to the present invention.
Figure 11:
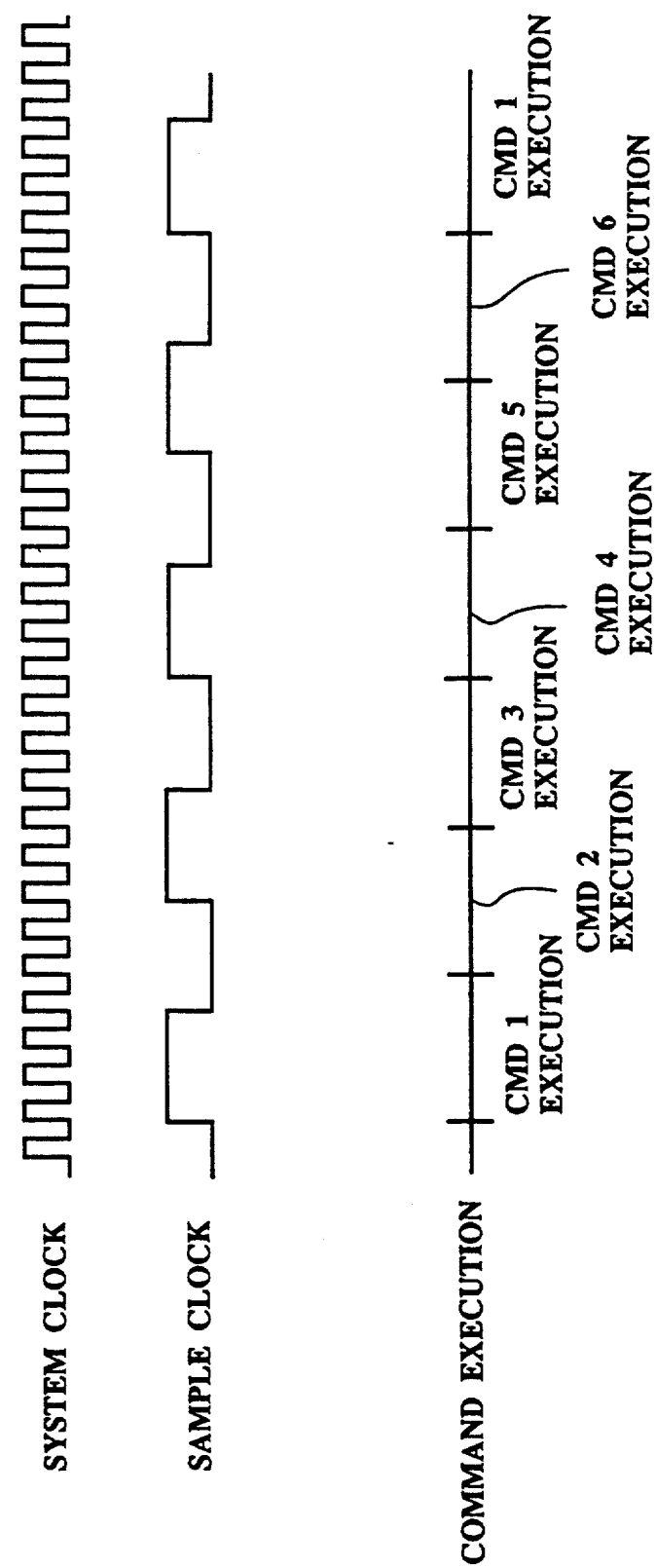
FIG. 11 is a timing chart to show an operation of the sequencer in the second embodiment of the pulse input device in FIG. 10.

FIG. 10 is a flowchart to show a command execution procedure in a sequencer of a second embodiment of the pulse input device according to the present invention, and FIG. 11 is a timing chart to show an operation of the sequencer in the embodiment in FIG. 10.

In the embodiment, the sequencer 709 is so constructed that each command execution time becomes constant. The function of the sequencer 709 can be realized, for example, by using a microprogram. In this case, it is necessary to provide instructions corresponding to the step for time adjustment in the microprogram anew.

Next, an operation of the pulse input device of the embodiment is explained. The pulse input device in the embodiment operates in accordance with the flowchart show in FIG. 10. In the operation, each command execution time becomes constant as shown in FIG. 11 irrespective of kinds and operational states of commands. For example, for the branch process of EDGE command or WIDTH command when the event discovery is NO, a step S43 for time adjustment for one clock is added and executed. While, with respect to NOP command, steps (S42 and S43) for time adjustment for two system clocks are added and executed. When the sequencer 709 having the function as mentioned above is realized by a microprogram, the instruction corresponding to the steps for time adjustment must be added in the microprogram. Accordingly, it is necessary to increase a storage capacity of the microprogram for containing the instruction. However, by this method, the trouble for introducing the command execution start wait signal as stated in the first embodiment can be avoided.

This embodiment is suitable for a case in which the number of commands is small, or the difference between the longest and shortest execution times is small.

Figure 12:
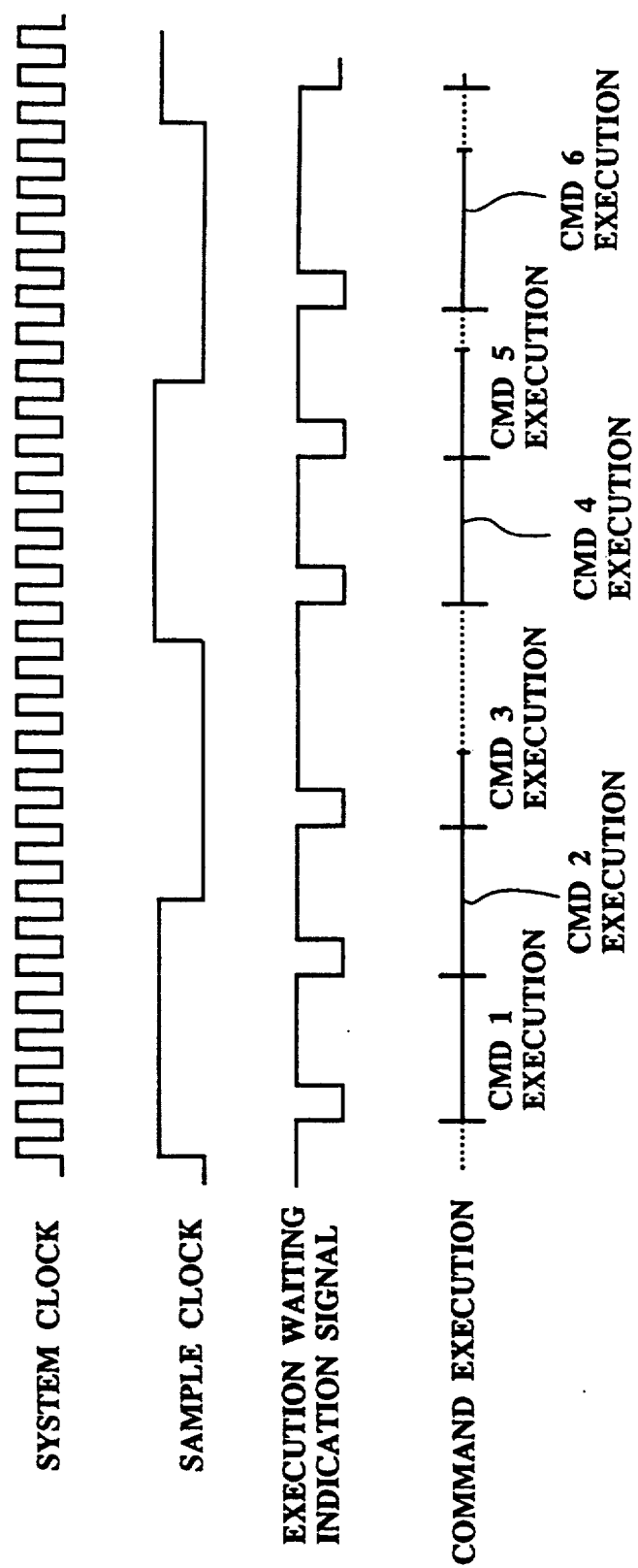
FIG. 12 is a timing chart to show an operation of a pulse input device in a third embodiment of the pulse input device according to the present invention.

FIG. 12 is a timing chart to show an operation of a sequencer in a third embodiment of the pulse input device according to the present invention. In this embodiment, similarly to the first embodiment, an execution start wait designation signal is used. However, the signal is different from the execution start wait designation signal introduced in the first embodiment in the following point. In this case, an arrival time of a signal next to a command (CMD3 command) in a particular order in the command scanning is delayed to some extent, and arrival times of the other execution start wait designation signals except for the command in the particular order are the same as those in the first embodiment. For example, the execution start wait designation signals are processed every four system clocks normally. However, with respect to CMD3 command, the signals are processed every six system clocks after execution of the command. Accordingly, the sequencer is constructed to realize this function.

Moreover, the execution start wait designation signal in the embodiment can be realized by adjusting the phases between the system clock and sample clock.

Next, an operation of the pulse input device of the third embodiment having the construction as explained above is described. In this case, the total number of commands is six, the maximum number of system clocks required for the respective commands is four, and the input signals are sampled every fourteen system clocks. In FIG. 12, the execution start wait designation signals for designating execution start of CMD4 command are processed every six system clocks later after arrival of the execution start wait designation signal of CMD3 command. Thus, this interval is longer than the maximum number of system clocks required for the command execution by two clocks. Moreover, in the two system clocks immediately before the execution start of CMD4 command, the input signal information is read into the input memory. During the reading, execution of commands is not carried out. Namely, when CMD3 command is rewritten with other commands, for example, a command of a longer execution time than CMD3 command, since the maximum number of system clocks required for the execution is four system clocks, the command execution is not carried out in the time corresponding to the two system clocks. Accordingly, since a timing of referring to the input memory and a timing of inputting input signals into the input memory are completely separated, the fine adustment on timing as required in the prior art becomes unnecessary.

This embodiment is effective in cases where the period of sampling input signals is a little longer than the number of system clocks required for the command execution.

Hereinafter, the fourth and the fifth embodiments of the pulse input device of the present invention will be described with reference to FIGS. 13 to 19.

In the construction of these embodiments, similar elements or similar portions to those in the first to the third embodiments are designated by similar reference numerals or characters, and these elements or portions are not described here.

In these embodiments, the input signal information storage means or the input memory is composed of a group of shift registers respectively corresponding to respective channels. Moreover, the input signals to be contained in the input signal information storage means or the input memory are expressed of values of input signals, i.e., signal values.

Figure 13:
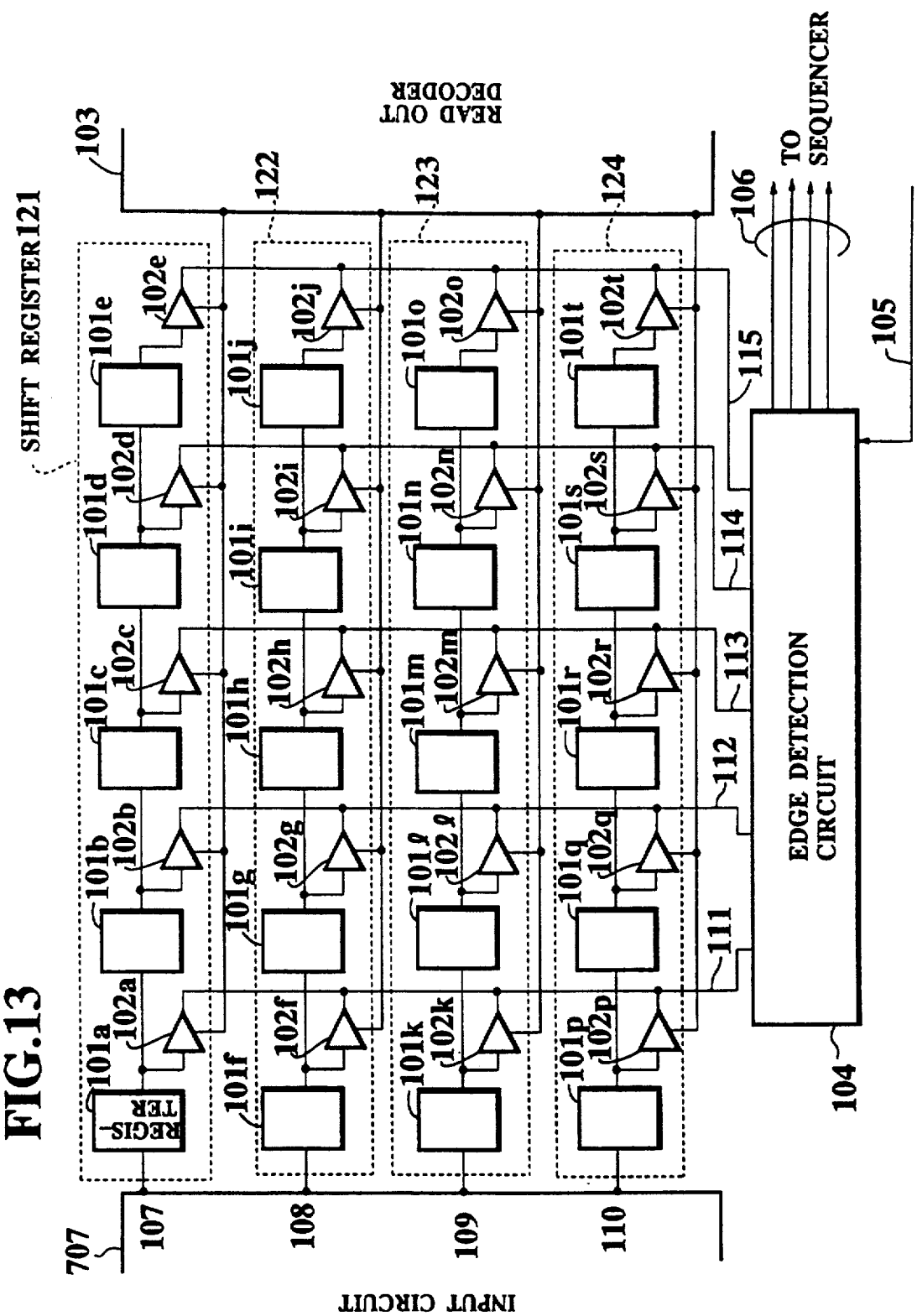
FIG. 13 is a constructional diagram of an input memory in a fourth embodiment of the pulse input device according to the present invention.
Figure 14:
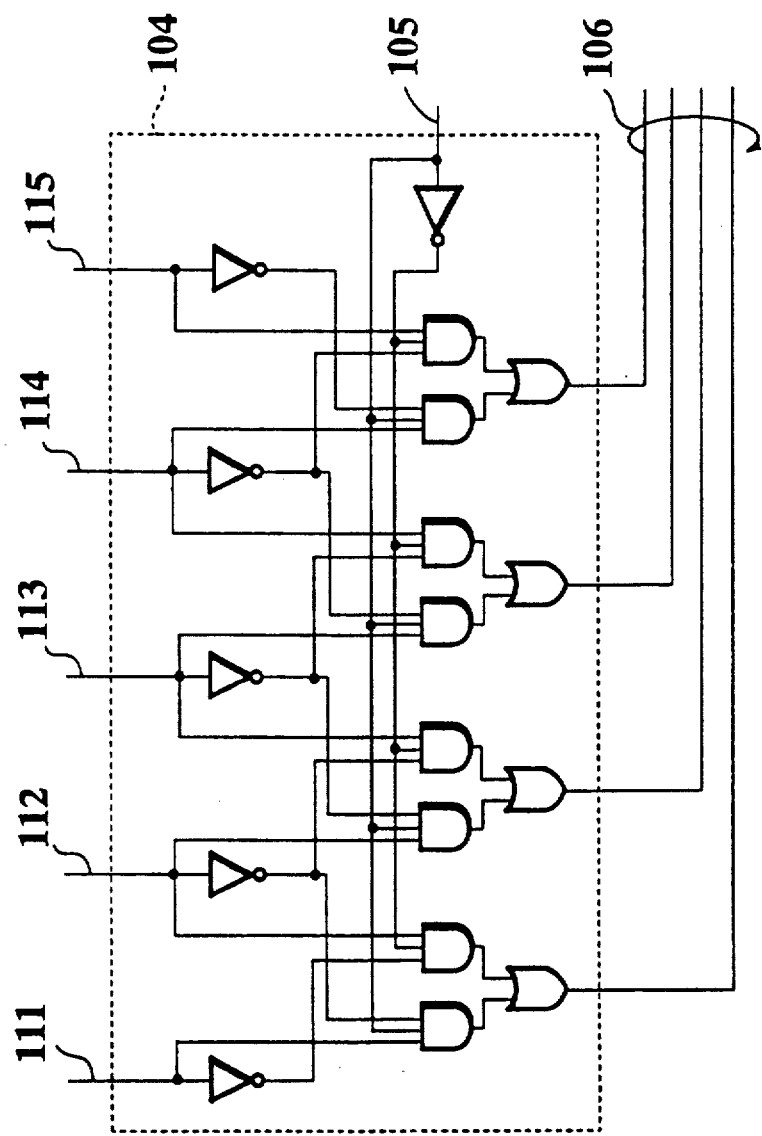
FIG. 14 is an diagram of an edge detection circuit for detecting change of input signals used in the fourth embodiment of the pulse input device in the present invention.

FIG. 13 is a constructional diagram of an input memory used in the pulse input device of the embodiments, and FIG. 14 shows an edge detection circuit for detecting change of input signal values stored in the input memory.

In these diagrams, reference numerals 101a to 101t respectively show 1-bit registers. A shift register 121 is composed of connecting the registers 101a to 101e in series. In the same manner, shift registers 122 to 124 are composed of connecting registers 101f to 101j, 101k to 101o, and 101p to 101t, respectively. Moreover, reference numerals 107, 108, 109 and 110 denote terminals corresponding to the respective channels, so that input signal information sampled from the respective channels is inputted through these terminals and shifted right by one bit in the sift registers. Accordingly, the shift registers 121 to 124 store past records of input signal values from the respective channels. Reference numerals 102a to 102t designate gates for reading storage contents or signal values in the respective registers 101a to 101t, each the gate is a three-state buffer able to change the output into a high impedance state. The input memory is composed of the shift registers 121 to 124 and gates 102a to 102t.

Reference numeral 103 is reading decoder for selecting the shift registers 121 to 124 specifically, and 104 shows an edge detection circuit for detecting change, i.e., rising edge or falling edge of the input signal information.

To obtain a specific shift register, selection from the shift registers is carried out by the decoder 103, and a change polarity designation signal for selecting the rising edge or falling edge is inputted into the edge detection circuit 104 through a control line 105. Thereby, the edge detection circuit 104 reads contents of the shift registers through signal lines 111 to 115 in parallel and simultaneously, then compares the contents of registers located next to each other to detect change of the input signal information. The detection result is outputted to instruction command execution control means or sequencer 709 through a signal line 106.

Next, an operation of the pulse input device using the input memory of the fourth embodiment having the construction as mentioned above will be explained with reference to FIGS. 15A to 15I and FIGS. 16A to 16B. FIGS. 15A to 15I respectively show storage contents of the input memory from a time 0 to 71 when the sequencer 709 refers to the input memory.

Each record of the input signal values from the respective channels are shown in one line, and times in every line show sampling times respectively. Accordingly, in every line, the sampling times are arranged from the left to right in a time series.

For example, whenever an input signal 1 is sampled, data of the input signal information are shifted right by a unit of time, then the rightmost data are thrown away and new data sampled are written in the column furthest to the left. In this case, the data written in the input memory are signal values of the input signals and not the change information of the input signals. Thereafter, each change of the input signals is detected from the signal values corresponding to sampling of the past five times.

In the detection, when the change polarity designation signal is 1, an input signal sampled at the previous time is 0 and an input signal sampled this time is 1, change from 0 to 1 (0→1) is detected. While, when the change polarity designation signal is 0, an input signal sampled at the previous time is 1 and an input signal sampled this time is 0, change from 1 to 0 (1→0) is detected. Incidentally, in this case, the input signals from the respective channels are sampled every eight clocks, and the respective commands are executed every four clocks, further eight commands are stored in the command memory. These commands are designated by the zeroth command, first command, . . . , seventh command in the order of scanning and reading. Moreover, the time gains one every clock. Under these conditions, when the sequencer 709 starts the scan of command memory at a time 0, the zeroth command is executed. At the time, in the input memory 708, input signals values as newest sample data at time 0 are contained. The previous data are not used, so that these are designated by a mark "—" (Meaningless Value) in the drawings.

FIG. 15A shows sampling times of data to be read when the input memory is referred to while the zeroth command and the first command are executed. In the time interval from the time 0 to 7 in which these commands are executed, only the input signal information sampled at the time 0 is contained. Therefore, the change information of input signals can not be obtained through the edge detection circuit 104.

FIG. 15B shows sampling times of data to be read when the input memory is referred to while the second command and the third command are executed. In the time interval from the time 8 to 15 in which these commands are executed, the change information of input signals generated at the time 0 and the time 8 can be obtained through the edge detection circuit 104.

FIG. 15C shows states of the input memory in a time interval of the time 16 to 23 in which the fourth command and the fifth command are executed, and FIG. 15D shows states of the input memory in a time interval of the time 24 to 31 in which the sixth command and the seventh command are executed. In FIG. 15C, the change information of input signals generated at the times 0, 8 and 16 is obtained through the edge detection circuit 104, while in FIG. 15D, the change information of input signals generated at the times 0, 8, 16 and 24 is obtained through the edge detection circuit 104.

Moreover, FIG. 15E shows states of the input memory in a time interval in which the zeroth command and the first command are executed in the second command scanning. In the time interval from the time 32 to 39 in which these commands are executed, the change information of input signals generated at the times 0, 8, 16, 24 and 32 can be obtained through the input memory.

In the same manner, FIG. 15F shows states of the input memory in a time interval in which the second command and the third command are executed in the second command scanning. In the time interval in which these commands are executed, the change information of input signals generated at the times 8, 16, 24, 32 and 40 can be obtained.

In a time interval shown in FIG. 15G, in which the fourth command and the fifth command are executed in the second command scanning, the change information of input signals generated at the times 16, 24, 32, 40 and 48 can be obtained.

Moreover, in a time interval shown in FIG. 15H, in which the sixth command and the seventh command are executed in the second command scanning, the change information of input signals generated at the times 24, 32, 40, 48 and 56 can be obtained through the edge detection circuit 104.

Thereafter, FIG. 15I is referred to with respect to the third command scanning of the zeroth command and the first command in the same manner.

As explained above, the range of change information is shifted by 32 clocks by every command execution. Thus, the range does not overlap the previous range, further there is no gap between them, irrespective of the storage order of commands in the command memory. The reason is that the respective commands are executed at constant time periods in the successive command scanning.

To obtain the function as explained above, it is not necessary to set the execution times of respective commands the same, but it is necessary to control them to be executed at constant periods in successive command scanning by the sequencer.

Next, detection delay of the change information of input signals in case of the input memory of the present invention is described.

All the commands are processed predeterminedly by the change information of input signals obtained in the intervals of four samples immediately before the execution. Accordingly, the longest detection delay is generated when a command samples change of input signals to be detected in next execution immediately after the execution of the command. The detection delay is 40 clocks obtained by addition of the command execution period of 32 clocks and the sampling period of 8 clocks. The detection delay becomes this value necessarily because the command is executed at a predetermined period and the input signals is periodically sampled. However, the construction is the most suitable for the input memory in this embodiment.

Next, the storage capacity required for the input memory construction of this embodiment is explained. Since the change information of input signals referred on respective command execution is only a portion sampled after execution of a command in the previous command scanning, the number of change information of input signals required coincide with the number of times of sampling the input signals in the command execution period. The command execution period of this embodiment is 32 clocks, and the input signals are sampled every 8 clocks. Thus, the storage capacity must be a value to contain change information in sampling of five times. Accordingly, as compared with the capacity of the input memory construction in the conventional double buffer method to store data in sampling of two times during the command execution period, the storage capacity can be reduced into a half.

Moreover, in this embodiment, since the detection process of the change information of input signals is carried out on reading the input memory, to obtain the change information in sampling of n times, states of input signals in the (n+1)th sampling must be stored. In this case, an input signal sampled is corresponding to one bit. Accordingly, as compared with n×4 bits per channel required in the conventional input memory using the double buffer, only (n+1) bits are required in the input memory of this embodiment.

When signal values sampled are directly contained in the input memory, and the detection of change of input signals is carried out using data read from the input memory, one sample of an input signal can be processed by one bit in the input memory. However, to detect the change of input signals, the oldest data must be stored by one additional bit, thus (n+1) bits must be provided in the input memory. Therefore, the storage capacity can be reduced into approximately half of that in the prior art for containing the change information of input signals.

Actually, since commands for designating operation of the pulse input device are written in the command memory after resetting the pulse input device and starting input of input signals, there are no meaningless data contained in the input memory. Moreover, it is possible that data inputted in the input memory are masked before the pulse input device starts command execution so as not to process the input signal information before the start of execution.

In the fourth embodiment, each command refers to the input memory only once to execute a predetermined process during the execution period. A process in which the input memory is referred to twice or more during one command execution or a process in which two or more commands realize a predetermined process (group-command process) in communication with each other is carried out.

Therefore, the storage contents of the input memory are rewritten in the lapse of time. Accordingly, in case of executing a command or a group of commands for carrying out a complicate process, the storage contents are sometimes rewritten before the process is completed, so that correct input information can not be obtained.

Hereinafter, an embodiment to solve the problem will be described with reference to FIGS. 16A to 16B, FIGS. 17A to 17G, FIGS. 18A to 18H, and FIG. 19.

For example, in a process for obtaining a time difference (hereinafter, it will be called "phase difference") between a rising edge time of an input signal 1 and a rising edge time of an input signal 2, (1) information on the rising edge time of the input signal 1, and (2) information on the rising edge time of the input signal 2 are required. Moreover, a site for containing the rising edge time of the input signal 1 and a site for containing the time difference between the rising edge time of the input signal 2 and the rising edge time of the input signal 1 are required.

In this process, since the input memory is referred to twice, an execution time for two commands is required. Accordingly, a storage site for two commands is provided in the command memory. FIGS. 16A and 16B are diagrams to explain storage arrangement in the command memory by the phase difference detection process. FIG. 16A shows a case in which input signals are not sampled during command execution, while FIG. 16B shows a case in which input signals are sampled and contents of the input memory are renewed during command execution.

Figures 17A, 17B, 17C:
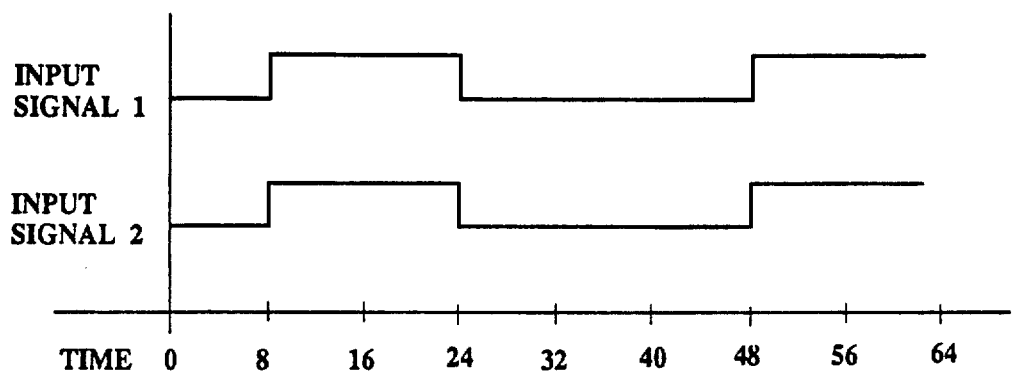

Next, a case in which commands arranged as shown in the drawings are executed, so as to measure the phase difference of input signals shown in FIG. 17A is considered. In FIG. 17A, since the rising edge time of the input signal 1 is equal to the rising edge time of the input signal 2, the phase difference is 0. In FIGS. 17B to 17G, records of signal values read from the input memory 708 and change information on input signals are shown according to the lapse of time.

As shown in FIGS. 17B to 17G, the construction of the input memory of this embodiment is similar to the case shown in FIGS. 15A to 15I.

In this case, data for five samples are contained in the input memory, and the change information for four samples can be obtained through a change detection circuit 104. In the same drawings, a mark, "—" shows no change of signal values, " ↑ " shows change of signal values from 0 to 1, and " ↓ " shows change thereof from 1 to 0.

In case of the command arrangement shown in FIG. 16A, the zeroth command and the first command read contents of the input memory at the times 0 (FIG. 17B) and 32 (FIG. 17F) together in successive command execution. Then, the zeroth command recognizes the rising edge of the input signal 1 at the time 32, and detects that the rising edge is generated at the time 8. The detection result is stored, for example, in a column to show the result by the zeroth command in the command memory. Since commands are executed every four clocks, the first command is executed at the time 36, recognizes the rising edge of the input signal 2, then detects the generation time to be 8. As the result, the time difference can be obtained by subtracting one from the other of both the generation times, and the resultant value becomes 0.

Next, in case of the command arrangement shown in FIG. 16B, the first command reads contents of the input memory at the times 4 (FIG. 17B) and 36 (FIG. 17F) in successive command scanning, and the second command reads contents of the input memory at the times 8 (FIG. 17C) and 40 (FIG. 17G).

The contents of the input memory are renewed during these command execution. First, the second command executed at the time 8 detects the rising edge of the input signal 2, however, since the rising edge of the input signal 1 precedent is not detected yet at the time, the process is not carried out. Then, the first command recognizes the rising edge of the input signal 1, and detects that the rising edge is generated at the time 8.

Though the second command is executed at the time 40, the contents of the input memory are renewed by signal values sampled anew, thus it can not be detected that the rising edge of the input signal 2 is generated at the time 8.

As stated above, when the input memory is referred to many times in the procedure to execute a series of processes, if contents of the input memory are renewed by sampling input signals on the way of executing the procedure, the commands can not be executed correctly.

To avoid the problem, an excessive site for one sample per channel is provided to the input memory, so that the oldest data is retained in the excessive site of the input memory. As result, the sequencer effects to obtain correct input information by carrying out a process for shifting sites of the input memory when the contents of the input memory are renewed on the way of executing the series of processes.

FIGS. 18A to 18H show construction of the input memory, which is entirely the same as that of the input memory shown in FIGS. 17B to 17G except that one storage site for one sample per channel is added.

Next, a method for measuring the phase difference of input signals shown in FIG. 17A under the command arrangements in FIGS. 16A and 16B by using the input memory is described with reference to FIGS. 18A to 18H.

First, in case of the command arrangement shown in FIG. 16A, contents of the input memory sampled at the times 0 (FIG. 18A) and 32 (FIG. 18F) are read in successive command execution of the zeroth and the first command. Then, the zeroth command recognizes the rising edge of the input signal 1 at the time 32, and detects that it is generated at the time 8. Thereafter, the first command is executed at the time 36, and the command recognizes the rising edge of the input signal 2, and detects that it is generated at the time 8. As the result, the time difference of 0 is obtained by subtracting the time of rising edge of the input signal 1 from that of the input signal 2. In this case, since the contents regarding the zeroth and the first command in the input memory are not renewed, the contents excessively provided in the input memory are not referred to, thus the state is the same as that shown in FIG. 17. However, in case of the command arrangement of FIG. 16B, the first command reads contents of the input memory sampled at the times 0 (FIG. 18A) and 32 (FIG. 18F) in the successive command execution. The second command reads contents of the input memory sampled at the times 8 (FIG. 18B) and 40 (FIG. 18G) in the successive command execution. The contents of the input memory are changed by sampling input signals during execution of the first command. Therefore, the sequencer can refer to the same contents as those referred to on execution of the first command by shifting the reading sites of the input memory by one sample in the direction of old data. Accordingly, the rising edge of the input signal 2 executed at the time 8 can not be detected. The third command reads contents of the input memory at the same time 8, however, since the command is independent of the first and the second command, the sequencer does not shift the reading sites in this case (FIG. 18C). Then, the first command recognizes the rising edge of the input signal 1 at the time 36, and detects that it is generated at the time 8 (FIG. 18F). The second command is executed at the time 40. However, since the sequencer shifts the contents of the input memory in this case (FIG. 18G), it can be detected that the rising edge is generated at 8. Accordingly, the correct time difference of 0 can be obtained by subtracting the rising edge time 8 of the input signal 1 from that of the input signal 2.

However, the input memory of this embodiment for renewing the contents of the input memory during command execution sometimes gives incorrect results when input memory is referred to many times or when the input memory is renewed in execution of a series of commands or a group of commands as a process. Therefore, the storage sites are so provided in the input memory that data corresponding to sampling of the maximum times possible in execution of a command with the longest execution time or a group of commands can be contained. As the result, when the input memory is renewed during command execution, the inconvenience as mentioned above can be avoided by optionally shifting the storage sites toward old input signal information.

Since it is enough to provide the storage site for one sample per channel at least in the input memory of this embodiment, the number of storage elements can be far reduced as compared with that of the double buffer method in the prior art.

In the above embodiment, the sequencer carries out the process required in case that the input memory is renewed during execution of one command or a group of commands. However, by providing a flag or a counter for showing the renewal of contents of the input memory, it is possible to detect with ease whether or how many times the input memory is renewed during the command execution. Accordingly, the construction of the input memory can be simplified.

In the above embodiments, the method for detecting change information of input signals in a shift register using an edge detection circuit as shown in FIG. 14 in the fourth embodiment and the method for preventing to overlook contents of input signal information by shifting them one by one using a shift register in the fifth embodiment are independent of each other, thus it is possible to compose the pulse input device using either one of the methods. In using the former, it is necessary to increase the capacity of the input memory in the fourth embodiment by a portion corresponding to one sample per channel as compared with the input memory of the conventional pulse input device. In using the latter, it is necessary to increase the capacity of the input memory in the fifth embodiment by a portion corresponding to at least one sample per channel.

It is also possible to compose the pulse input memory using both the methods. In this case, it is necessary to increase the capacity of the input memory by a portion corresponding to at least two samples per channel, where a portion for one sample per channel is used for the method of detecting the change information of input signals in a shift register, and the other portion for one sample per channel is used for the method of preventing to overlook contents of the input signal information by shifting them one by one.

FIG. 19 is a constructional diagram of an input memory in which the methods of the fourth and the fifth embodiment are utilized together. In the same drawing, registers each for one sample are added to respective shift registers in channels as compared with the input memory 121 in the fourth embodiment. Moreover, reference numeral 118 denotes a switch used as shift reading means.

It should be clearly understood that the pulse input device of the present invention is not limited to the first to the third embodiment. The subject matter of the invention is to fix the time difference between an execution start time of a command to be executed in command scanning in a predetermined order and another execution start time of a command executed in command scanning in the previous or next order irrespective of the number of times of the command scanning. In this case, it is possible to optionally and suitably change the relation between each command execution time and sampling time of the input signal information.

Moreover, in the fourth and the fifth embodiment of the present invention, the shift register is directly used as input memory. However, these embodiments are not limited to the construction. It is possible to obtain the same effect if the shift register is logically composed of RAM and a pointer as input signal information storage means. Further, in these embodiments, the ratio between each command execution time and the sampling period is an integer. However, this invention is not limited thereto.

Furthermore, in the fifth embodiment, the storage contents of the input memory are input signal values. However, it is also possible that the contents are change information of input signals. In this case, though the capacity of the input signal information storage means can not be reduced as compared with the input memory in the prior art, as explained in the fifth embodiment, it is possible to prevent to overlook the input change information in the input memory by shifting them.

Various modifications will become possible for those skilled in the art after receiving the teachings of the present disclosure without departing from the scope thereof.

What is claimed is:

1. A pulse input device comprising:
input storage means for sampling input signals from a plurality of channels at a predetermined period and for storing said input signals;
command storage means for storing a plurality of instruction commands; and
control means comprising:
  means for scanning said instruction commands stored in said command storage means to successively execute said instruction commands,
  means for repeating a command scanning operation of said instruction commands,
  means for reading said input signals from said input storage means, and
  means for controlling the sampling of input signals in said input storage means,
wherein said control means outputs a designation signal for designating an execution starting time for each of said instruction commands for executing each of said instruction commands,
each of said instruction commands is executed in response to said designation signal in the successive command scanning operation,
a period of an execution starting time for one instruction command to be executed in a predetermined order in a command scanning operation is different from that of an execution starting time for another instruction command to be executed in a predetermined order in the command scanning operation in adjacent instruction scanning operations, and said input signals are sampled in the execution operation of an instruction command having the longest period of the execution starting time.

2. A pulse input device comprising:
input storage means for sampling input signals from a plurality of channels at a predetermined time and for storing the input signal information for designating the state of change of the adjacent input signals sampled from each of said plurality of channels;
command storage means for storing a plurality of instruction commands; and
control means comprising:
  means for successively reading out and then executing the instruction command obtained by scanning said plurality of instruction commands stored in said command storage means,
  means for repeating the scanning operation of said instruction commands,
  means for controlling a period of an execution time of each of said instruction commands between adjacent scanning operations to be a constant value,
  means for controlling the sampling of input signals in said input storage means, and
  means for referring to contents of said input signal information obtained at a predetermined sampling time stored in said input storage means even when said contents in input storage means are renewed with input signals samples by said input storage means during an execution time of an instruction command group consisting of at least one instruction command,
wherein said input storage means has a storage capacity for storing one input signal information in addition to the input signal information including the maximum number of sampling in the scanning operation period and the maximum number of the sample during the execution operation for said instruction command group.

3. A pulse input device according to claim 2, wherein said input storage means comprises a plurality of shift registers, respectively corresponding to said plurality of channels, for storing signal information output from said plurality of channels.

4. A pulse input device comprising:
input storage means for sampling input signals from a plurality of channels at a predetermined period and for storing signal values for designating the values of the input signals;
command storage means for storing a plurality of instruction commands; and
control means comprising:
  means for reading out and then executing the instruction command stored in said command storage means by scanning said instruction commands in said command storage means,
  means for repeating the scanning operation of said instruction commands, and
  means for controlling the period of the execution time of each of said instruction commands to be constant between adjacent command scanning operations,
wherein said input storage means further includes a change information detection means for detecting a change between adjacent signal values obtained in the same channel sampled in sequence, said control means controls the operation of the change information detection means and reads out the signal values stored in the input storage means to detect a change information between the two signals successively sampled, and said input storage means has a storage capacity for storing signal values sampled at predetermined times required during one command execution operation and one signal value sampled at one time.

5. A pulse input device comprising:

input storage means for sampling input signals from a plurality of channels at a predetermined period and for storing change information for designating the states of changes of the input signals sampled from each of said plurality of channels;

command storage means for storing a plurality of instruction commands; and control means, receiving change information from said input storage means, comprising:

means for reading out and then executing the instruction commands obtained by scanning said instruction commands stored in said command storage means, means for repeating the scanning operation of said instruction commands, means for controlling a scanning operation period as a period of an execution time of each of said instruction commands to be constant between adjacent scanning operations to obtain correctly contents of said change information stored in said input storage means even when the contents of the change information stored in said input storage means are renewed by the input signals sampled by said input storage means during an execution time of an instruction group consisting of at least one instruction command, and means for controlling the sampling of said input signals in said input storage means, wherein said input storage means samples the signals predetermined times in the execution time period of each of the instruction commands, said input storage means includes a change information detection means for detecting the change information between adjacent input signals which are successively sampled under the control of said control means, said input storage means has a capacity of an amount storing one input signal information in addition to the input signal information including the maximum number of the samplings in the scanning operation period and the maximum number of the samplings during the execution operation for the instruction command group.

* * * * *